United States Patent
Butterfield et al.

(10) Patent No.: US 11,620,598 B2
(45) Date of Patent: Apr. 4, 2023

(54) ELECTRONIC BOARD ASSOCIATED WITH A COMMUNICATION PLATFORM

(71) Applicant: Slack Technologies, Inc., San Francisco, CA (US)

(72) Inventors: Daniel Stewart Butterfield, San Francisco, CA (US); Matthew Hodgins, Toronto (CA); Michael Hahn, San Francisco, CA (US); Neil Kamireddy, San Francisco, CA (US); Paul Duan, San Francisco, CA (US); Zach Forrest y Salazar, Santa Barbara, CA (US); James Colgan, San Francisco, CA (US); Siddhi Soman, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 10 days.

(21) Appl. No.: 16/993,859

(22) Filed: Aug. 14, 2020

(65) Prior Publication Data
US 2022/0051169 A1 Feb. 17, 2022

(51) Int. Cl.
*G06Q 10/06* (2012.01)
*G06Q 10/0631* (2023.01)

(52) U.S. Cl.
CPC ........... *G06Q 10/063118* (2013.01); *G06Q 10/06316* (2013.01); *G06Q 10/063114* (2013.01)

(58) Field of Classification Search
CPC .................................................. G06Q 10/06
See application file for complete search history.

(56) References Cited

U.S. PATENT DOCUMENTS

| 2014/0165152 A1* | 6/2014 | Farouki | H04N 7/15 |
| | | | 726/4 |
| 2018/0287982 A1 | 10/2018 | Draeger et al. | |
| 2019/0108240 A1* | 4/2019 | Jalagam | G06F 16/288 |

(Continued)

OTHER PUBLICATIONS

David Auerbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.

(Continued)

*Primary Examiner* — Kurtis Gills
(74) *Attorney, Agent, or Firm* — Lee & Hayes, P.C.

(57) ABSTRACT

A board associated with a communication platform and/or one or more channels associated therewith is described. In an example, the board can be associated with editable text and one or more objects capable of being at least one of reordered, added, deleted, or edited. In an example, the one or more objects can be associated with one or more sections. In an example, a communication platform can perform a modification to the board, based at least in part on receiving a request associated with the modification, and can cause the board to be presented via a user interface associated with a member of at least one communication channel with which the board is associated. In an example, the board can be sharable with users associated with different communication channels, workspaces, organizations, or the like.

20 Claims, 9 Drawing Sheets

(56) References Cited

U.S. PATENT DOCUMENTS

2020/0366629 A1* 11/2020 Jalil .................... G06Q 10/101
2021/0342785 A1* 11/2021 Mann ................. H04L 65/4015

OTHER PUBLICATIONS

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.
"Die, Email, Die! A Flickr Cofounder Aims To Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 3 pages.
Robert Hof, "Stewart Butterfield On How Slack Became A $2.8 Billion Unicorn", FORBES, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.
"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.
Matthew Ingram, "Flickr co-founder launches Slack, an all-in-one messaging tool designed to kill email forever", GIGAOM, Lexisnexis, https://advance.lexis.com/api/permalink/0b676b7c-aec3-4560-861e-d030d1dd008c/?context=1000516, (dated Feb. 12, 2014, 7:03 PM), 3 pages.
Internet Relay Chat, Wikipedia, [online][retrieved May 30, 2019]. Retrieved from the Internet: <URL: https://en.wikipedia.org/wiki/Internet_Relay_Chat>. (dated May 28, 2019) 21 pages.
Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 3 pages.
Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.
Matsumoto, T. et al., "Chocoa Communicator—A New Communication System Based on Awareness and Text Communications", FUJITSU Sci. Tech. J., 36, 2, (Dec. 2000) pp. 154-161.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.
Ernie Smith, "Picking Up The Slack", TEDIUM, [online][retrieved May 9, 2019]. Retrieved from the Internet: <URL: https://tedium.co/2017/10/17/irc-vs-slack-chat-history/>. (dated Oct. 17, 2017) 8 pages.
The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.
Jonathan Vanian, "Why these startups think chat apps are the next big thing in workplace collaboration", GIGAOM, Lexisnexis, https://advance.lexis.com/api/permalink/e83778c8-09c8-43aa-9ba0-88526283de69/?context=1000516, (dated Aug. 1, 2014, 5:45 PM) 4 pages.
Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 3 pages.
Microsoft Teams "Adding Boards to Microsoft Teams", retrieved on Aug. 19, 2020 at <<https://docs.kudosapps.com/boards/howto/adding-boards-to-teams/>>, 5 pages.
Bacchus, "How to communicate effectively with the Wiki tab in Microsoft Teams", retrieved on Aug. 19, 2020 at <<https://www.onmsft.com/how-to/how-to-communicate-effectively-with-the-wiki-tab-in-microsoft-teams>>, 4 pages.
Microsoft Teams, "Add and use a Wiki tab in Teams", retrieved on Aug. 19, 2020 at <<https://support.microsoft.com/en-gb/office/add-and-use-a-wiki-tab-in-teams-35ec762d-72ec-4d7f-b858-2949f6cb6014>>, 3 pages.
Microsoft Teams, "Use Wikis" retrieved on Aug. 19, 2020 at <<https://www.customguide.com/microsoft-teams/use-wikis>>, 7 pages.
Microsoft, "Use Planner in Microsoft Teams", retrieved on Aug. 19, 2020 at <<https://support.microsoft.com/en-us/office/use-planner-in-microsoft-teams-62798a9f-e8f7-4722-a700-27dd28a06ee0>>, 10 pages.
Nopanen, "Microsoft Teams Wikis and Meeting Notes: breakdown", retrieved on Aug. 19, 2020 at <<https://myteamsday.com/20i9/12/15/microsoft-teams-wikis-and-meeting-notes-breakdown/>>, 16 pages.
Redmond, "Inside the Teams Wiki", retrieved on Aug. 19, 2020 at <<https://office365itpros.com/2018/10/05/inside-teams-wiki/>>, 9 pages.

* cited by examiner

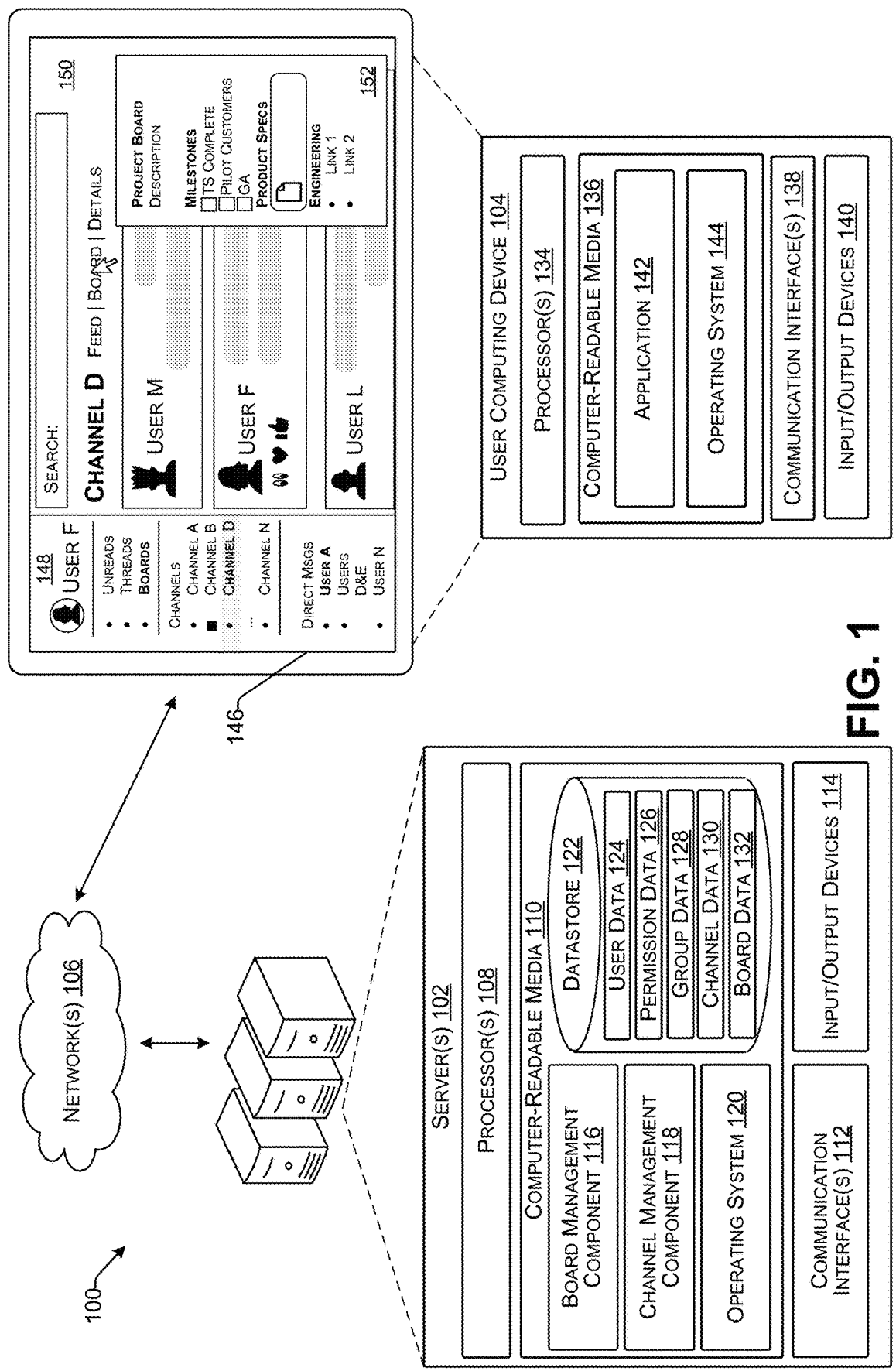

148 USER F

200
- UNREADS
- THREADS
- ...
- BOARDS

202 CHANNELS
- CHANNEL A
- CHANNEL B
- CHANNEL C
- CHANNEL D
- ...
- CHANNEL N

204 DIRECT MSGS
- USER A
- USERS D&E
- ...
- USER N

SEARCH: _____ 206

150
CHANNEL D  FEED | BOARD | DETAILS — 208

USER M  1:10 PM

USER F  9:12 AM

USER L  10:10 AM

152 — 212
PROJECT BOARD  210
DESCRIPTION
PROJECT LEAD: @USERA

MILESTONES  214
☐ TS COMPLETE  216
☐ PILOT CUSTOMERS
☐ GA

PRODUCT SPECS
PRD 1

DESIGN DOC

ENGINEERING
- LINK 1
- LINK 2

SHARE 218

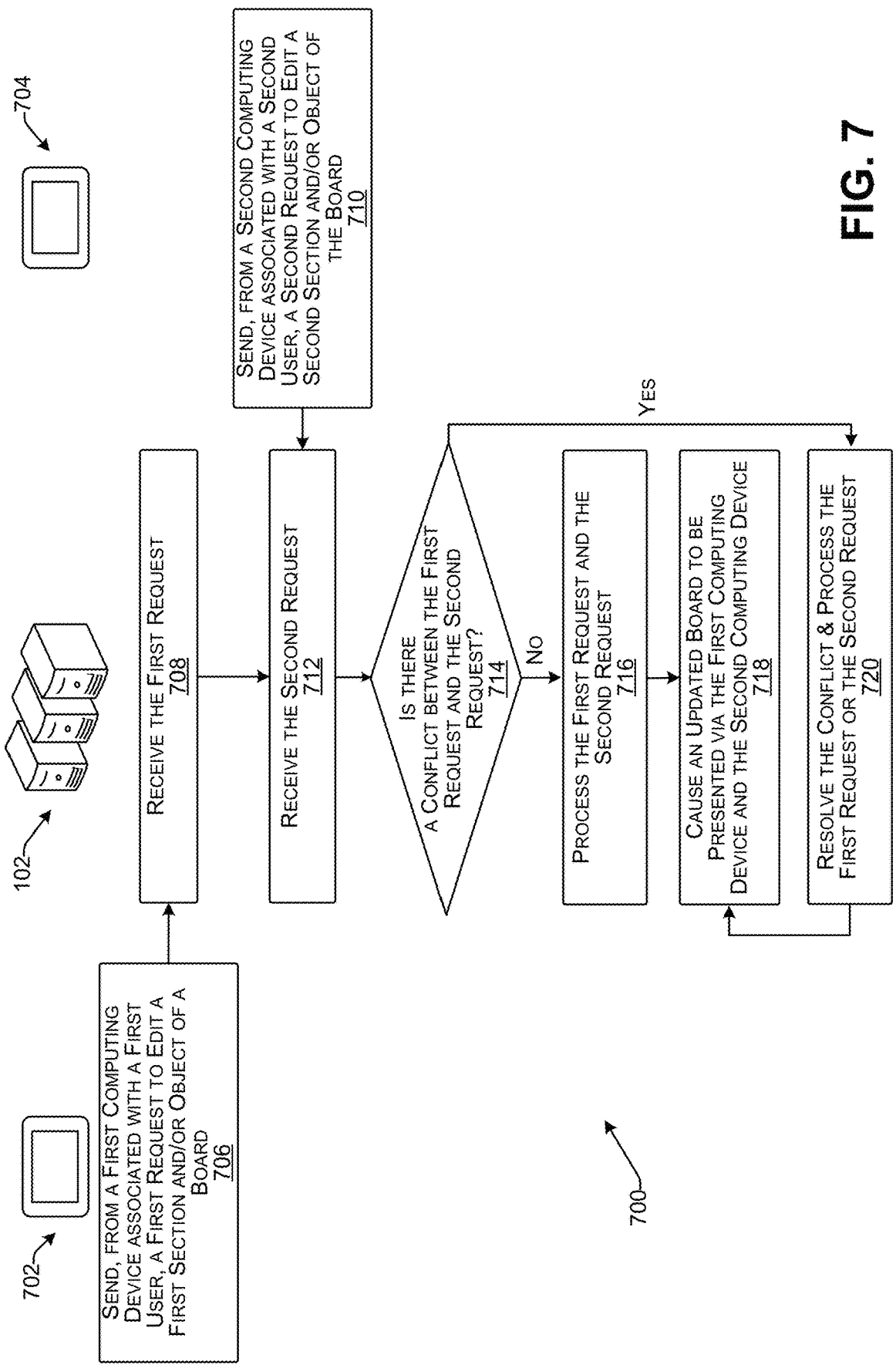

ELECTRONIC BOARD ASSOCIATED WITH A COMMUNICATION PLATFORM

TECHNICAL FIELD

A communication platform can leverage a network-based computing system to enable users to exchange data. In an example, users of the communication platform can communicate with other users via communication channels (or "channels"). A communication channel, or other virtual space, can be a data route used for exchanging data between and among systems and devices associated with the communication platform. For example, a communication channel may be established between and among various user computing devices, allowing the user computing devices to communicate and share data between and among each other over one or more networks. That is, in some examples, the communication platform can be a channel-based messaging platform and/or hub for facilitating communication between and among users. In some examples, data associated with a communication channel can be presented via a user interface.

In some examples, members of a communication channel can share data (e.g., post messages, share a file, etc.) and/or otherwise interact with the communication channel. In some examples, such data and/or interactions can be presented in a feed, wherein the data and/or interactions (or indications thereof) are organized and/or sortable by time (e.g., when associated data is posted or an associated interaction is otherwise performed), type (e.g., of action), user, or the like. In some examples, the amount of data shared and/or the number of interactions can cause the feed to become cluttered. Furthermore, in some examples, the amount of data shared and/or the number of interactions can cause portions of the feed to scroll out of view via the user interface such that member(s) of the communication channel can be required to scroll through significant amounts of data to view data shared to and/or interactions with the communication channel.

BRIEF DESCRIPTION OF THE DRAWINGS

The detailed description is described with reference to the accompanying figures. In the figures, the left-most digit of a reference number identifies the figure in which the reference number first appears. The use of the same reference number in different figures indicates similar or identical components or features. The figures are not drawn to scale.

FIG. 1 illustrates an example environment for performing techniques described herein.

FIG. 2B illustrates another example user interface associated with a board, as described herein.

FIG. 7 illustrates another example process for modifying a board, as described herein.

DETAILED DESCRIPTION

Figure 2A:
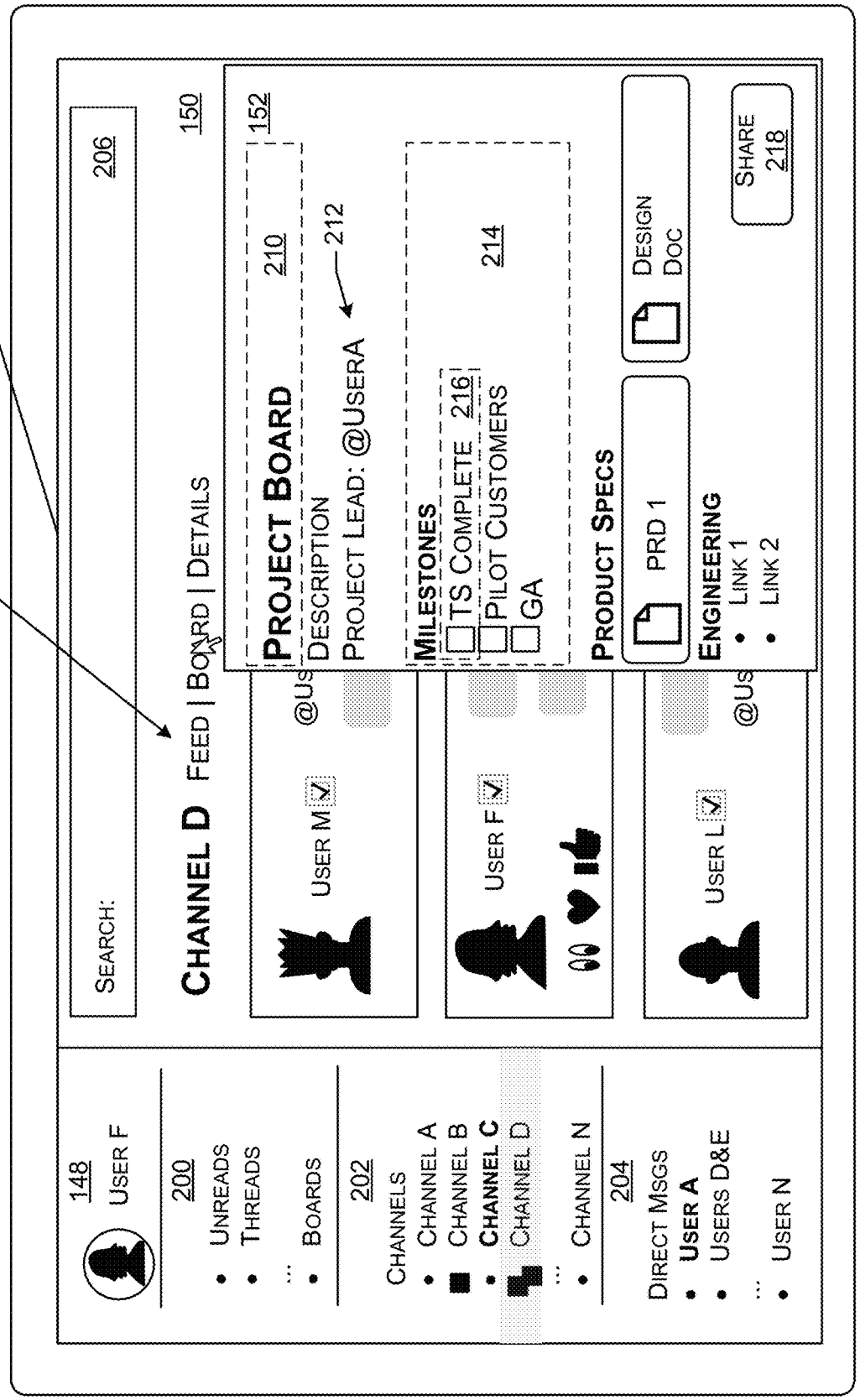
FIG. 2A illustrates an example user interface associated with a board, as described herein.

Boards associated with a communication platform are described herein. In at least one example, a communication platform can be associated with a group-based communication platform and/or a channel-based messaging platform. In at least one example, boards, as described herein, can be associated with individual groups and/or communication channels to enable users of the communication platform to create, interact with, and/or view data associated with such boards. That is, a board, which can be an "electronic board," can be a virtual space, canvas, page, or the like for collaborative communication and/or organization within the communication platform.

In at least one example, techniques described herein are directed to the creation, modification, and/or presentation of a virtual space, canvas, page, or the like for collaborative communication and/or organization within the communication platform. Such a virtual space, canvas, page, or the like can be referred to as an "board." In at least one example, a board can support editable text and/or objects that can be ordered, added, deleted, modified, and/or the like. In some examples, a board can be associated with permissions defining which users of a communication platform can view and/or edit the board. In some examples, a board can be associated with a communication channel and at least some members of the communication channel can view and/or edit the board. In some examples, a board can be sharable such that data associated with the board is accessible to and/or interactable for members of the multiple communication channels, workspaces, organizations, and/or the like.

In at least one example, a board can include section(s) and/or object(s). In some examples, each section can include one or more objects. In at least one example, an object can be associated with an object type, which can include, but is not limited to, text (e.g., which can be editable), a task, an event, an image, a graphic, a link to a local object, a link to a remote object, a file, and/or the like. In some examples, the sections and/or objects can be reordered and/or otherwise rearranged, new sections and/or objects can be added or removed, and/or data associated with such sections and/or objects can be edited and/or modified. That is, boards can be created and/or modified for various uses. That is, users can customize and/or personalize boards to serve individual needs as described herein.

As an example, sections and/or objects can be arranged to create a project board that can be used to generate and/or assign tasks, track progress, and/or otherwise manage a project. Further, in some examples, boards can present company metrics and also enable access to company goals so that such information can be stored and/or accessed via a single location. In some examples, boards can be used to keep track of work progress and/or career growth, which can be used by managers or supervisors for managing and/or supervising employees, agents, and/or other workers. In at least one example, a board can be used to track incidents, incoming customer service requests, and/or the like.

As described above, in some examples, boards can be associated with communication channels. A communication channel, or virtual space, can be a data route used for exchanging data between and among systems and devices associated with the communication platform. In at least one example, a communication channel can be between and among various user computing devices, allowing the user computing devices to communicate and share data between and among each other. In at least one example, users who subscribe to updates associated with a communication channel and/or have permission to view, share, and/or interact with data associated with a communication channel can be referred to as "members" of the communication channel. In at least one example, members of a communication channel can reorder, add, remove, or modify sections and/or objects associated with a board associated with the communication channel.

In at least one example, a board can be shared with users of a communication platform other than members of a communication channel with which the board is associated. In some examples, a board can be shared with users associated with a workspace, an organization, or the like. In such examples, users associated with the workspace, the organization, or the like can access and/or interact with the board (e.g., regardless of whether they are members of the communication channel(s) with which the board is associated). In some examples, a board can be shared between two or more communication channels. In such examples, the board can be accessed and/or otherwise interacted with by members associated with the two or more communication channels.

In some examples, the two or more communication channels can be associated with the same workspace and/or same organization or different workspaces and/or different organizations. In some examples, a board may be associated with channels from different workspaces. In some examples, a board may include files or messages associated with channels from different workspaces. In some examples, a board may be associated with channels from different organizations. In some examples, a board may include files or messages associated with channels from different organizations. That is, in some examples, boards can be shared externally and/or with external communication channels.

As described above, in some examples, members of a communication channel can share data (e.g., post messages, share a file, etc.) and/or otherwise interact with the communication channel (e.g., data associated therewith). In some examples, such data and/or interactions can be presented in a feed, wherein the data and/or interactions (or indications thereof) are organized and/or sortable by time (e.g., when associated data is posted or an associated interaction is otherwise performed), type (e.g., of action), user, or the like. In some examples, the amount of data shared and/or the number of interactions can cause the feed to become cluttered (e.g., messing and/or overwhelming). Furthermore, in some examples, the amount of data shared and/or the number of interactions can cause portions of the feed to scroll out of view via the user interface such that member(s) of the communication channel can be required to scroll through significant amounts of data to view data shared to and/or interactions with the communication channel. That is, in some example data shared into a communication channel and/or indications of interactions associated therewith can quickly disappear, which can cause confusion due to the challenge associated with maintaining context associated with the communication channel.

Techniques described herein describe a virtual space, canvas, board, and/or the like that enables users to store data and/or enable access to data stored locally and/or remotely via a single user interface. That is, techniques described herein enable users to add data and/or mechanisms for accessing data to a board so that users of a communication platform (e.g., members of the communication channel with which the board is associated) can easily access data without having to scroll through a feed to locate said data and/or maintain context. As such, techniques described herein provide improvements to computing technologies, specifically as they pertain to streamlining user interactions with user interfaces as described herein.

Moreover, in some examples, to perform tasks or otherwise complete work, users can traverse workflows that span multiple computing tools and/or products. Users can be easily confused and/or lost, thereby wasting time and energy. In some examples, such time and energy can be consumed by users determining how to switch contexts and/or maintain a mental state. In some examples, such time and energy can be consumed by computing devices that are executing multiple computing tools and/or products that are individually consuming computing resources and space on a user interface. The boards described herein can enable streamlined workflows that can be managed and/or tracked via a single computing tool and/or product. As such, techniques described herein can conserve resources (i.e., both mental and computational) compared to existing techniques. Thus, techniques described herein provide improvements to computing technologies, specifically as they pertain to streamlining user interactions with user interfaces as described herein.

Furthermore, techniques described herein can leverage permissions to maintain security and/or privacy for boards and/or data associated therewith.

Additional details and examples are described below with reference to FIGS. 1-7.

FIG. 1 illustrates an example environment 100 for performing techniques described herein. The example environment 100 can be associated with a communication platform that can leverage a network-based computing system to enable users of the communication platform to exchange data. In at least one example, the communication platform can be "group-based" such that the platform, and associated systems, communication channels, messages, and/or virtual spaces, have security (that can be defined by permissions) to limit access to defined groups of users. In some examples, such groups of users can be defined by identifiers, as described above, which can be associated with common access credentials, domains, or the like. In some examples, the communication platform can be a hub, offering a secure and private virtual space to enable users to chat, meet, call, collaborate, transfer files or other data, or otherwise communicate between or among each other.

In some examples, each group can be associated with an organization, which can be associated with an organization identifier. Users associated with the organization identifier can chat, meet, call, collaborate, transfer files or other data, or otherwise communicate between or among each other in a secure and private virtual space available via the communication platform. In some examples, users associated with a same organization can be associated with a same set of permissions, which can be associated with the organization. Users of different organizations can be associated with different permissions.

In some examples, each group can be associated with a workspace, associated with a workspace identifier. Users associated with the workspace identifier can chat, meet, call, collaborate, transfer files or other data, or otherwise communicate between or among each other in a secure and private virtual space available via the communication platform. In some examples, users associated with a same workspace can be associated with a same set of permissions, which can be associated with the workspace. In some examples, users associated with different workspaces, can be associated with different permissions.

In some examples, a group can be associated with multiple organizations and/or workspaces. In some examples, an organization can be associated with multiple workspaces.

In at least one example, the example environment 100 can include one or more server computing devices (or "server(s)") 102. In at least one example, the server(s) 102 can include one or more servers or other types of computing devices that can be embodied in any number of ways. For example, in the case of a server, the functional components and data can be implemented on a single server, a cluster of servers, a server farm or data center, a cloud-hosted computing service, a cloud-hosted storage service, and so forth, although other computer architectures can additionally or alternatively be used.

In at least one example, the server(s) 102 can communicate with a user computing device 104 via one or more network(s) 106. That is, the server(s) 102 and the user computing device 104 can transmit, receive, and/or store data (e.g., data, information, or the like) using the network(s) 106, as described herein. The user computing device 104 can be any suitable type of computing device, e.g., portable, semi-portable, semi-stationary, or stationary. Some examples of the user computing device 104 can include a tablet computing device, a smart phone, a mobile communication device, a laptop, a netbook, a desktop computing device, a terminal computing device, a wearable computing device, an augmented reality device, an Internet of Things (IOT) device, or any other computing device capable of sending communications and performing the functions according to the techniques described herein. While a single user computing device 104 is shown, in practice, the example environment 100 can include multiple (e.g., tens of, hundreds of, thousands of, millions of) user computing devices. In at least one example, user computing devices, such as the user computing device 104, can be operable by users to, among other things, access communication services via the communication platform. A user can be an individual, a group of individuals, an employer, an enterprise, an organization, or the like. In some examples, users can be associated with designated roles (e.g., administrator, team leader, etc.) and/or types (e.g., verified, etc.).

The network(s) 106 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. Components used for such communications can depend at least in part upon the type of network, the environment selected, or both. Protocols for communicating over such network(s) 106 are well known and areAdd not discussed herein in detail.

In at least one example, the server(s) 102 can include one or more processors 108, computer-readable media 110, one or more communication interfaces 112, and input/output devices 114.

In at least one example, each processor of the processor(s) 108 can be a single processing unit or multiple processing units, and can include single or multiple computing units or multiple processing cores. The processor(s) 108 can be implemented as one or more microprocessors, microcomputers, microcontrollers, digital signal processors, central processing units (CPUs), graphics processing units (GPUs), state machines, logic circuitries, and/or any devices that manipulate signals based on operational instructions. For example, the processor(s) 108 can be one or more hardware processors and/or logic circuits of any suitable type specifically programmed or configured to execute the algorithms and processes described herein. The processor(s) 108 can be configured to fetch and execute computer-readable instructions stored in the computer-readable media, which can program the processor(s) to perform the functions described herein.

The computer-readable media 110 can include volatile, nonvolatile, removable, and/or non-removable memory or other media implemented in any type of technology for storage of data, such as computer-readable instructions, data structures, program modules, or other data. Such computer-readable media 110 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired data and that can be accessed by a computing device. Depending on the configuration of the server(s) 102, the computer-readable media 110 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 110 can be used to store any number of functional components that are executable by the processor(s) 108. In many implementations, these functional components comprise instructions or programs that are executable by the processor(s) 108 and that, when executed, specifically configure the processor(s) 108 to perform the actions attributed above to the server(s) 102. Functional components stored in the computer-readable media can optionally include a board management component 116, a channel management component 118, an operating system 120, and a datastore 122.

In at least one example, the board management component 116 can facilitate the creation of, modification of, and/or presentation of boards, as described herein. In some examples, the board management component 116 can present user interfaces to enable users to generate boards comprising one or more sections and/or one or more objects. In some examples, data associated with generated electric boards can be stored in the datastore 122. In some examples, the board management component 116 can present user interfaces to enable users to modify boards and/or data associated therewith. That is, in some examples, upon receiving a request to modify a board, the board management component 116 can access data associated with the board and can cause the presentation of one or more user interfaces to enable modification to the board. The board management component 116 can process such modifications. Such modifications can be reflected in a modified board that can be caused to be presented via user interfaces and/or in data associated with the board (e.g., as stored in the datastore 122). In at least one example, the board management component 116 can facilitate the sharing of boards (e.g., with different channels, different groups of users, users associated with different groups, and/or the like), searching for data associated with boards, and/or the like. Additional details associated with operations performable by the board management component 116 are described below.

In at least one example, the channel management component 118 can manage communication channels. As described above, in at least one example, the communication platform can be a channel-based messaging platform, that in some examples, can be usable by group(s) of users. As described above, each group can be associated with a group identifier (e.g., organization identifier, workspace identifier) and one or more user accounts can be mapped to, or otherwise associated with, the group identifier. User(s) corresponding to such user account(s) can be "members" of the group. Users of the communication platform can communicate with other users via communication channels. A communication channel, or virtual space, can be a data route used for exchanging data between and among systems and devices associated with the communication platform. In at least one example, the channel management component 118 can establish a communication channel between and among various user computing devices, allowing the user computing devices to communicate and share data between and among each other. In at least one example, the channel management component 118 can manage such communications and/or sharing of data. In some examples, data associated with a communication channel can be presented via a user interface. In at least one example, the channel management component 118 can interact with the board management component 116 to manage the generation, presentation, and/or updating of user interfaces. Additional details of operations that are performable by the channel management component 118 are described below.

In some examples, a communication channel may be "public," which may allow any user within a group (e.g., associated with an organization identifier, associated with a workspace identifier, etc.) to join and participate in the data sharing through the communication channel, or a communication channel may be "private," which may restrict data communications in the communication channel to certain users or users having particular roles (e.g., managers, administrators, etc.) and/or types (e.g., verified, etc.). In some examples, a communication channel may be "shared," which may allow users associated with two or more different groups (e.g., entities associated with two or more different organization and/or workspace identifiers) to join and participate in the data sharing through the communication channel. Shared channels may be public such that they are accessible to any user of either group, or they may be private such that they are restricted to access by certain users or users having particular roles and/or types. Boards can similarly be "public," "private," and/or "shared," such that boards can be associated with the same or similar permissions and/or restrictions (or lack thereof) as public channels, private channels, and/or shared channels.

In at least one example, the channel management component 118 can receive a request to generate a communication channel. In some examples, the request can include a name that is to be associated with the communication channel, one or more users to invite to join the communication channel, and/or permissions associated with the communication channel. In some examples, the user(s) can be associated with a same group as the requesting group or a different group. For example, in some examples, one or more of the user(s) can be associated with a different group such that the communication channel can be "externally" shared. As described above, in at least one example, a first organization (or the host organization) can invite a second organization (or the invited organization) to join a communication channel. A resulting channel can be called a "shared communication channel" or an "externally shared communication channel." In some examples, an administrator or other user associated with the first organization can invite new members in the first organization or the second organization via a mention, a profile view, an email, or generating a link from a user interface associated with the communication channel that enables users to be added to the communication channel.

In at least one example, users can be added or removed from a shared communication channel. Users who are associated with a shared communication channel can access and/or otherwise interact with data associated with the shared communication channel. Users who are not associated with a shared communication channel, may not access and/or otherwise interact with data associated with the shared communication channel. In some examples, a user can preview data associated with a shared communication channel, but may not be able to interact with such data if the user is not associated with the shared communication channel.

As described above, users of different workspaces or other groups can create shared communication channels using same or similar techniques.

In at least one example, the operating system 120 can manage the processor(s) 108, computer-readable media 110, hardware, software, etc. of the server(s) 102.

In at least one example, the datastore 122 can be configured to store data that is accessible, manageable, and updatable. In some examples, the datastore 122 can be integrated with the server(s) 102, as shown in FIG. 1. In other examples, the datastore 122 can be located remotely from the server(s) 102 and can be accessible to the server(s) 102 and/or user device(s), such as the user computing device 104. The datastore 122 can comprise one multiple databases, which can include user data 124, permission data 126, group data 128, channel data 130, and board data 132. Additional or alternative data may be stored in the data store and/or one or more other data stores.

In at least one example, the user data 124 can store data associated with users of the communication platform. In at least one example, the user data 124 can store data in a user profile (which can also be referred to as a "user account"), which can store data associated with a user, including, but not limited to, one or more user identifiers associated with multiple, different organizations, groups, or entities with which the user is associated, one or more communication channel identifiers associated with communication channels to which the user has been granted access, one or more group identifiers for groups (or, organizations, teams, entities, or the like) with which the user is associated, an indication whether the user is an owner or manager of any communication channels, an indication whether the user has any communication channel restrictions, a plurality of messages, a plurality of emojis, a plurality of conversations, a plurality of conversation topics, an avatar, an email address, a real name (e.g., John Doe), a username (e.g., j doe), a password, a time zone, a status, a token, and the like.

In at least one example, the permission data 126 can store data associated with permissions of individual users of the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with an individual user can be mapped to, or otherwise associated with, an account or profile associated with the user data 124. In some examples, permissions can indicate which users can communicate directly with other users, which channels a user is permitted to access, restrictions on individual channels, which workspaces the user is permitted to access, restrictions on individual workspaces, and the like. In at least one example, the permissions can support the communication platform by maintaining security for limiting access to a defined group of users. In some examples, such users can be defined by common access credentials, group identifiers, or the like, as described above.

In some examples, the permission data 126 can store data associated with permissions of groups associated with the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with a group can be mapped to, or otherwise associated with, data associated with the group in the group data 128. In some examples, permissions can indicate restrictions on individual groups, restrictions on communication channel(s) associated with individual groups, restrictions on board(s) associated with individual groups, restrictions on user(s) associated with individual groups, and the like. In at least one example, the permissions can support the communication platform by maintaining security for limiting access to a defined group of users. In some examples, such groups can be defined by common access credentials, group identifiers, or the like, as described above.

In some examples, the permission data 126 can store data associated with permissions of individual communication channels. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with a communication channel can be mapped to, or otherwise associated with, data associated with the communication channel in the channel data 130. In some examples, permissions can indicate restrictions on individual communication channels, restrictions on user(s) associated with individual communication channels, and the like.

In some examples, the permission data 126 can store data associated with permissions of individual boards. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with a board can be mapped to, or otherwise associated with, data associated with the board in the board data 132. In some examples, permissions can indicate restrictions on individual boards, restrictions on user(s) associated with individual boards, and the like.

In at least one example, the group data 128 can store data associated with individual groups, which as described above, can be organizations, workspaces, or the like. As described above, the communication platform can be partitioned into groups associated with groups of users. In at least one example, a group identifier can be associated with a group that is registered, or otherwise associated with the communication platform. In at least one example, the group identifier can indicate a physical address in the group data 128 where data related to the corresponding group is stored. In at least one example, data associated with group permissions can be stored in association with the group identifier, data identifying users associated with the group can be stored in association with the group identifier, data associated with messages and/or other data associated with the group can be stored in association with the group identifier, data associated with communication channels associated with the group can be stored in association with the group identifier, and the like. In some examples, such data can be mapped to, or otherwise associated with, other types of data in the datastore 122 (e.g., the user data 124, the permission data 126, the channel data 130, etc.).

In at least one example, the channel data 130 can store data associated with individual communication channels. In at least one example, the channel management component 118 can establish a communication channel between and among various user computing devices, allowing the user computing devices to communicate and share data between and among each other. In at least one example, a communication channel identification may be assigned to a communication channel, which indicates the physical address in the channel data 130 where data related to that communication channel is stored.

In at least one example, the board data 132 can store data associated with boards, as described herein. In some examples, the board data 132 can store indications of individual boards, data associated therewith, identifier(s) associated with entities (e.g., users, workspaces, organizations, etc.) and/or communication channel(s) associated therewith, permissions data associated therewith, and/or the like. In at least one example, a board identification may be assigned to a board, which indicates the physical address in the board data 132 where data related to that board is stored.

In some examples, the datastore 122 can be partitioned into discrete items of data that may be accessed and managed individually (e.g., data shards). Data shards can simplify many technical tasks, such as data retention, unfurling (e.g., detecting that message contents include a link, crawling the link's metadata, and determining a uniform summary of the metadata), and integration settings. In some examples, data shards can be associated with groups (e.g., organizations, workspaces), communication channels, users, or the like.

In some examples, individual groups can be associated with a database shard within the datastore 122 that stores data related to a particular group identification. For example, a database shard may store electronic communication data associated with members of a particular group, which enables members of that particular group to communicate and exchange data with other members of the same group in real time or near-real time. In this example, the group itself can be the owner of the database shard and has control over where and how the related data is stored. In some examples, a database shard can store data related to two or more groups (e.g., as in a shared channel).

In some examples, a communication channel can be associated with a database shard within the datastore 122 that stores data related to a particular channel identification. For example, a database shard may store electronic communication data associated with the communication channel, which enables members of that particular communication channel to communicate and exchange data with other members of the same communication channel in real time or near-real time. In this example, a group or organization can be the owner of the database shard and can control where and how the related data is stored.

In some examples, a board can be associated with a database shard within the datastore 122 that stores data related to a particular board identification. For example, a database shard may store electronic communication data associated with the board, which enables members associated with that board to post data that can be accessible to other members associated with the same board in real time or near-real time. In this example, a user, a group, and/or an organization can be the owner of the database shard and can control where and how the related data is stored.

In some examples, individual users can be associated with a database shard within the datastore 122 that stores data related to a particular user account. For example, a database shard may store electronic communication data associated with an individual user, which enables the user to communicate and exchange data with other users of the communication platform in real time or near-real time. In some examples, the user itself can be the owner of the database shard and has control over where and how the related data is stored.

The communication interface(s) 112 can include one or more interfaces and hardware components for enabling communication with various other devices (e.g., the user computing device 104), such as over the network(s) 106 or directly. In some examples, the communication interface(s) 112 can facilitate communication via Web sockets, Application Programming Interfaces (APIs) (e.g., using API calls), HyperText Transfer Protocols (HTTPs), etc.

The server(s) 102 can further be equipped with various input/output devices 114 (e.g., I/O devices). Such I/O devices 114 can include a display, various user interface controls (e.g., buttons, joystick, keyboard, mouse, touch screen, etc.), audio speakers, connection ports and so forth.

In at least one example, the user computing device 104 can include one or more processors 134, computer-readable media 136, one or more communication interfaces 138, and input/output devices 140.

In at least one example, each processor of the processor(s) 134 can be a single processing unit or multiple processing units, and can include single or multiple computing units or multiple processing cores. The processor(s) 134 can comprise any of the types of processors described above with reference to the processor(s) 108 and may be the same as or different than the processor(s) 108.

The computer-readable media 136 can comprise any of the types of computer-readable media 136 described above with reference to the computer-readable media 110 and may be the same as or different than the computer-readable media 110. Functional components stored in the computer-readable media can optionally include at least one application 142 and an operating system 144.

In at least one example, the application 142 can be a mobile application, a web application, or a desktop application, which can be provided by the communication platform or which can be an otherwise dedicated application. In some examples, individual user computing devices associated with the environment 100 can have an instance or versioned instance of the application 142, which can be downloaded from an application store, accessible via the Internet, or otherwise executable by the processor(s) 134 to perform operations as described herein. That is, the application 142 can be an access point, enabling the user computing device 104 to interact with the server(s) 102 to access and/or use communication services available via the communication platform. In at least one example, the application 142 can facilitate the exchange of data between and among various other user computing devices, for example via the server(s) 102. In at least one example, the application 142 can present user interfaces, as described herein. In at least one example, a user can interact with the user interfaces via touch input, keyboard input, mouse input, spoken input, or any other type of input. Techniques described herein can be facilitated via other access points, such as web browsers or the like.

A non-limiting example of a user interface 146 is shown in FIG. 1. As illustrated in FIG. 1, the user interface 146 can present data associated with one or more communication channels and, in some examples, one or more groups. In some examples, the user interface 146 can include a first region 148, or pane, that includes indicator(s) (e.g., user interface element(s) or object(s)) representing data associated with the group(s), communication channel(s), etc. with which the user (e.g., account of the user) is associated. Additional details associated with the first region 148 and indicator(s) are described below with reference to FIG. 2.

In at least one example, the user interface 146 can include a second region 150, or pane, that can be associated with a data feed (or, "feed") indicating messages posted to and/or actions taken with respect to one or more communication channels and/or other virtual spaces for facilitating communications (e.g., a virtual space associated with direct message communication(s), a virtual space associated with event(s) and/or action(s), etc.) as described herein. In at least one example, data associated with the second region 150 can be associated with the same or different workspaces. That is, in some examples, the second region 150 can present data associated with the same or different workspaces via an integrated feed. In some examples, the data can be organized and/or is sortable by workspace, time (e.g., when associated data is posted or an associated operation is otherwise performed), type (e.g., of action), communication channel, user, or the like. In some examples, such data can be associated with an indication of which user (e.g., member of the communication channel) posted the message and/or performed an action. In examples where the second region 150 presents data associated with multiple workspaces, at least some data can be associated with an indication of which workspace the data is associated with. Additional details associated with the user interface 146, and the second region 150, are described below with reference to FIG. 2.

In at least one example, a board 152 can be presented via the user interface 146. In at least one example, the board 152 can be presented via a pop-up, as illustrated in FIG. 1. However, in some examples, the board 152 can be presented via a new user interface and/or new window, an overlay, a separate region, pane, and/or window proximate to the second region 150, a split region, pane, and/or window with the feed within the second region 150, instead of the second region 150, and/or the like. In at least one example, the board 152 can be accessible via a user interface element presented via the first region 148 (e.g., "Boards"). In some examples, the board 152 can be accessible via a user interface element presented via the second region 150. In some examples, the board 152 can be accessible via a universal resource identifier (URI) or other identifier associated with the board 152.

In some examples, the board 152 can be associated with at least one communication channel (e.g., Channel D) and can be sharable with other entities (e.g., users, communication channels, workspaces, organizations, etc.). As described below, the board 152 can include one or more sections and/or one or more objects. In at least one example, the one or more sections and/or one or more objects can be editable and can be added, removed, and/or rearranged by users having permissions to edit and/or rearrange data associated with the board 152 (e.g., member(s) of a communication channel with which the board 152 is associated and/or other user(s) having permissions to enable them to edit and/or rearrange data associated with the board 152). Additional details associated with the user interface 146 and boards, such as the board 152, are described below with reference to FIGS. 2A-2C.

In at least one example, the operating system 144 can manage the processor(s) 134, computer-readable media 136, hardware, software, etc. of the user computing device 104.

The communication interface(s) 138 can include one or more interfaces and hardware components for enabling communication with various other devices (e.g., the user computing device 104), such as over the network(s) 106 or directly. In some examples, the communication interface(s) 138 can facilitate communication via Websockets, APIs (e.g., using API calls), HTTPs, etc.

The user computing device 104 can further be equipped with various input/output devices 140 (e.g., I/O devices). Such I/O devices 140 can include a display, various user interface controls (e.g., buttons, joystick, keyboard, mouse, touch screen, etc.), audio speakers, connection ports and so forth.

While techniques described herein are described as being performed by the board management component 116, the channel management component 118, and the application 142, techniques described herein can be performed by any other component, or combination of components, which can be associated with the server(s) 102, the user computing device 104, or a combination thereof.

Figure 2C:
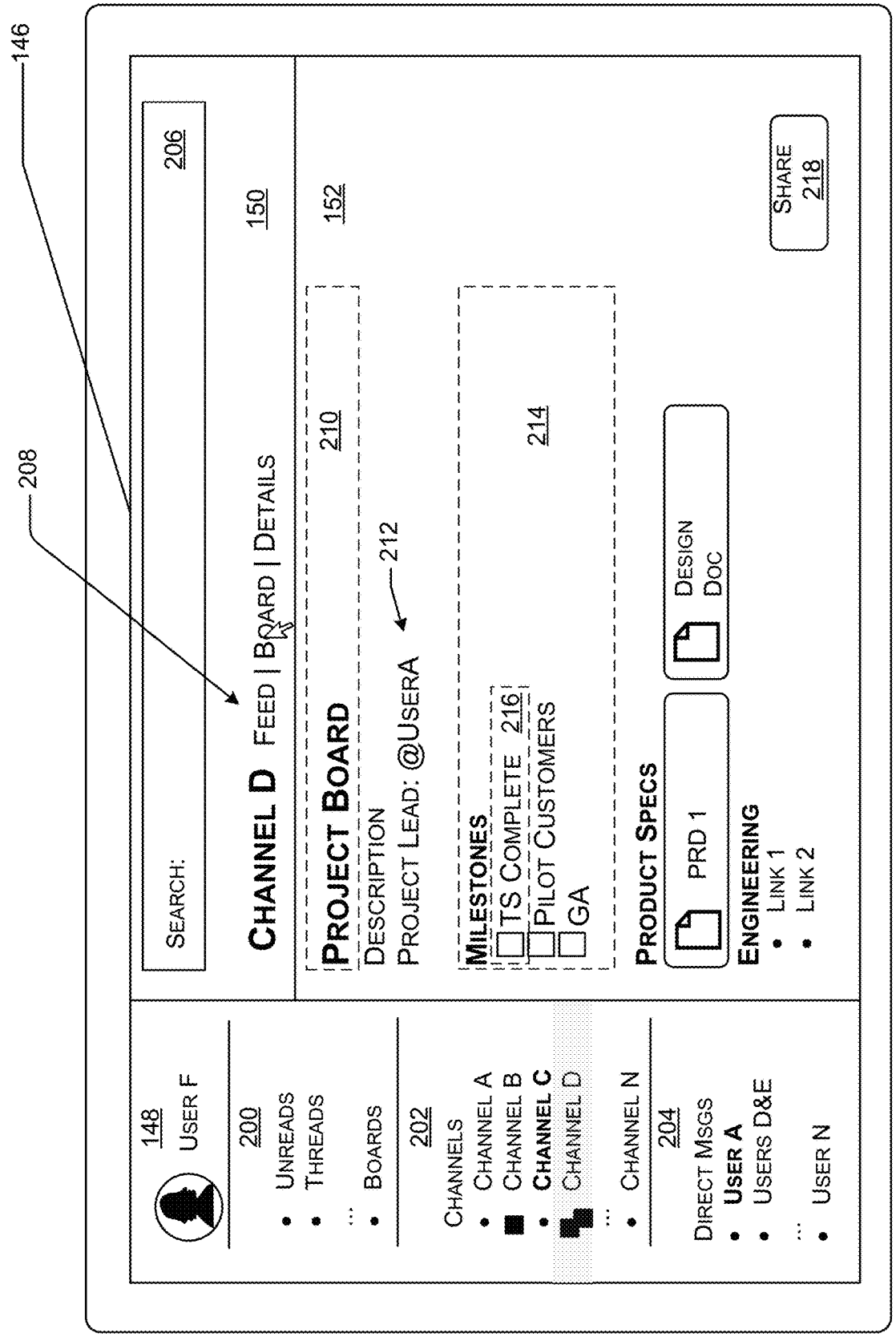
FIG. 2C illustrates yet another example user interface associated with a board, as described herein.

FIGS. 2A-2C illustrate additional details associated with the user interface 146 and the board 152, as described herein.

As described above, in some examples, the user interface 146 can include a first region 148, or pane, that includes indicator(s) (e.g., user interface element(s) or object(s)) representing virtual space(s) associated with the workspace(s) with which the user (e.g., account of the user) is associated. In at least one example, the first region 148 can include one or more sub-sections, or sub-panes, which can represent different virtual spaces. For example, a first sub-section 200 can include indicators representing virtual spaces that can aggregate data associated with a plurality of communication channels and/or workspaces. In at least one example, each virtual space can be associated with an indicator in the first sub-section 200. In some examples, an indicator can be associated with an actuation mechanism such that when actuated, can cause the application 142 to present data associated with the corresponding virtual space via the second region 150. In at least one example, a virtual space can be associated with all unread data associated with each of the workspaces with which the user is associated. That is, in some examples, if the user requests to access the virtual space associated with "unreads," all data that has not been read (e.g., viewed) by the user can be presented in the second region 150, for example in a feed. In such examples, different types of events and/or actions, which can be associated with different communication channels and/or virtual spaces, can be presented via a same feed. In some examples, such data can be organized and/or is sortable by workspace, time, type, communication channel, user, or the like. In some examples, such data can be associated with an indication of which user (e.g., member of the communication channel) posted the message and/or performed an action. If at least one of the user or a group with which the user is associated are verified, the indication can be associated with an indicator indicating that the user and/or group is/are verified. Additional details are described below.

In some examples, each virtual space can be associated with a same type of event and/or action. For example, "threads" can be associated with messages, files, etc. posted in threads to messages posted in a communication channel and "boards" can be associated with boards with which the user has access. That is, in some examples, same types of events and/or actions, which can be associated with different communication channels and/or virtual spaces, can be presented via a same feed. As with the "unreads" virtual space, data associated with such virtual spaces can be organized and/or is sortable by workspace, time, type (e.g., of action), communication channel, user, or the like.

In at least one example, the first region 148 of the user interface 146 can include a second sub-section 202, or sub-pane, that includes indicators representing communication channels. In some examples, the communication channels can include public channels, private channels, shared channels (e.g., between workspaces or organizations), single workspace channels, cross-workspace channels, combinations of the foregoing, or the like. In some examples, the communication channels represented can be associated with a single workspace. In some examples, the communication channels represented can be associated with different workspaces (e.g., cross-workspace). In at least one example, if a communication channel is cross-workspace (e.g., associated with different workspaces), the user may be associated with both workspaces, or may only be associated with one of the workspaces. In some examples, the communication channels represented can be associated with combinations of communication channels associated with a single workspace and communication channels associated with different workspaces.

In some examples, the second sub-section 202 can depict all communication channels, or a subset of all communication channels, that the user has permission to access (e.g., as determined by the permission data 126). In such examples, the communication channels can be arranged alphabetically, based on most recent interaction, based on frequency of interactions, based on communication channel type (e.g., public, private, shared, cross-workspace, etc.), based on workspace, in user-designated sections, or the like. In some examples, the second sub-section 202 can depict all communication channels, or a subset of all communication channels, that the user is a member of, and the user can interact with the user interface 146 to browse or view other communication channels that the user is not a member of but are not currently displayed in the second sub-section 202. In some examples, different types of communication channels (e.g., public, private, shared, etc.) can be in different sections of the second sub-section 202, or can have their own sub-regions or sub-panes in the user interface 146. In some examples, communication channels associated with different workspaces can be in different sections of the second sub-section 202, or can have their own regions or panes in the user interface 146.

In some examples, the indicators can be associated with user interface elements that visually differentiate types of communication channels. For example, Channel D is associated with a double square user interface element instead of a circle user interface element. As a non-limiting example, and for the purpose of this discussion, the double square user interface element can indicate that the associated communication channel (e.g., Channel D) is an externally shared communication channel. In some examples, such a user interface element can be the same for all externally shared communication channels. In other examples, such a user interface element can be specific to the other group with which the externally shared communication channel is associated. In yet another example, a user interface element can be associated with a communication channel to indicate that the communication channel is associated with limited permissions. For example, the single square associated with Channel B can indicate that Channel B is associated with limited permissions. In some examples, additional or alternative graphical elements can be used to differentiate between public communication channels, private communication channels, shared communication channels, communication channels associated with different workspaces, and the like. In other examples, communication channels that the user is not a current member of may not be displayed in the second sub-section 202 of the user interface 146. In such examples, the user may navigate to a different interface (not shown) to browse additional channels that are accessible to the user but to which the user is not currently a member.

In addition to the second sub-section 202, the first region 148 can include a third sub-section 204, or sub-pane, that can include indicators representative of communications with individual users or multiple specified users (e.g., instead of all, or a subset of, members of an organization). Such communications can be referred to as "direct messages." That is, the third sub-section 204, or sub-pane, can include indicators representative of virtual spaces that are associated with private messages between one or more users.

As described above, in at least one example, the user interface 146 can include a second region 150, or pane, that is associated with a feed indicating messages posted to and/or actions taken with respect to a communication channel and/or other virtual space (e.g., a virtual space associated with direct message communication(s), a virtual space associated with event(s) and/or action(s), etc.) for facilitating communications. As described above, in at least one example, data associated with the second region 150 can be associated with the same or different workspaces. That is, in some examples, the second region 150 can present data associated with the same or different workspaces via an integrated feed. In some examples, the data can be organized and/or is sortable by workspace, time, type of action, communication channel, user, or the like. In some examples, such data can be associated with an indication of which user posted the message and/or performed an action.

For purposes of this discussion, a "message" can refer to any electronically generated digital object provided by a user using the user computing device 104 and that is configured for display within a communication channel and/or other virtual space for facilitating communications (e.g., a virtual space associated with direct message communication(s), etc.) as described herein. A message may include any text, image, video, audio, or combination thereof provided by a user (using a user computing device). For instance, the user may provide a message that includes text, as well as an image and a video, within the message as message contents. In such an example, the text, image, and video would comprise the message. Each message sent or posted to a communication channel of the communication platform can include metadata comprising a sending user identifier, a message identifier, message contents, a group identifier, a communication channel identifier, or the like. In at least one example, each of the foregoing identifiers may comprise American Standard Code for Information Interchange (ASCII) text, a pointer, a memory address, or the like.

In some examples, a user can comment on a message in a "thread." A thread can be a message associated with another message that is not posted to a communication channel, but instead is maintained within an object associated with the original message. Messages and/or threads can be associated with file(s), emoji(s), app(s), etc.

A communication channel or other virtual space can be associated with data and/or data other than messages, or data and/or data that is associated with messages. For example, non-limiting examples of additional data that can be presented via the second region 150 of the user interface 146 include members added to and/or removed from the communication channel, file(s) (e.g., file attachment(s)) uploaded and/or removed from the communication channel, application(s) added to and/or removed from the communication channel, post(s) (data that can be edited collaboratively, in near real-time by one or members of a communication channel) added to and/or removed from the communication channel, description added to, modified, and/or removed from the communication channel, modifications of properties of the communication channel, etc.

In some examples, the second region 150 can comprise a feed associated with a single communication channel. In such examples, data associated with the communication channel can be presented via the feed. In at least one example, data associated with a communication channel can be viewable to at least some of the users of a group of users associated with a same group identifier. In some examples, for members of a communication channel, the data of the communication channel (e.g., messaging communications) can be displayed to each member of the communication channel. For instance, a common set of group-based messaging communications can be displayed to each member of the communication channel such that the data of the communication channel (e.g., messaging communications) may not vary per member of the communication channel. In some examples, messaging communications associated with a communication channel can appear differently for different users (e.g., based on personal configurations, group membership, permissions, policies, etc.).

In at least one example, the format of the individual communication channels or virtual spaces may appear differently to different users. In some examples, the format of the individual communication channels or virtual spaces may appear differently based on which workspace or organization a user is currently interacting with or most recently interacted with. In some examples, the format of the individual communication channels or virtual spaces may appear differently for different users (e.g., based on personal configurations, group membership, permission(s), etc.).

In at least one example, the user interface 146 can include a search mechanism 206, wherein a user can input a search term and the server(s) 102 can perform a search associated with the communication platform. In some examples, the search can be performed across each group with which the user is associated, or the search can be restricted to a particular group, based on a user specification. In some examples, the search can be performed relative to a communication channel, a board, and/or the like.

In FIG. 2A, the user can interact with the user interface element that corresponds to Channel D in the second sub-section 202 and as such, a feed associated with the communication channel can be presented via the second region 150 of the user interface. In some examples, user interface elements 208 representing information associated with Channel D can be presented in association with the second region 150 and/or operations that can be performed in association with Channel D. In at least one example, the one or more user interface elements 208, which can be selectable, can enable a user to view data associated with the communication channel (e.g., Channel D). Such user interface elements can be tabs, for example, that the user can use to access different types of data. For instance, a user can select "feed" to view the feed as illustrated in FIG. 2A. In another example, a user can select "board" to view a board associated with the communication channel. In yet another example, a user can select details to view details associated with the communication channel. Additional or alternative user interface elements 208 can be presented via the user interface 146.

In at least one example, the application 142 can detect that a user has provided an input requesting to view a board associated with the communication channel. In some examples, such an input can be actuation of one of the user interface elements 208. In some examples, if a single board is associated with the communication channel, the application 142 can cause the board to be presented via the user interface 146. A non-limiting example of a board 152 is illustrated in FIG. 2A. In some examples, a communication channel can be associated with multiple boards. In such examples, the user can provide an additional input to indicate which board he or she desires to access.

In at least one example a board can be presented via a pop-up, as illustrated in FIG. 2A. However, in some examples, a board can be presented via a new user interface and/or new window, an overlay, a separate region, pane, and/or window proximate to the second region 150, a split region, pane, and/or window with the feed within the second region 150, instead of the second region 150, and/or the like. FIGS. 2B and 2C illustrate alternative example presentations of the board. FIG. 2B illustrates a split pane within the second region 150, wherein the feed is associated with a first portion and the board is associated with a second portion. FIG. 2C illustrates an example wherein the board 152 is presented instead of the second region 150. As described above, however, the board 152 can be presented in any number of configurations within the user interface 146.

In some examples, if a board is associated with a direct message conversation the direct message conversation can be presented via a user interface similar to the user interface 146 described herein. In such examples, a board associated with the direct message conversation can be accessible via a user interface element presented via the first region 148 and/or a user interface element presented via the second region 150.

In at least one example, the board 152 can be associated with a header or title section 210 that can comprise editable text. In at least one example, a user can associate a title with the board 152 and can input the title via the header or title section 210. In some examples, the header or title section 210 can be associated with one or more objects 212 whereby the user can add a description of the board 152, user(s) associated with the board 152, and/or the like. In some examples, the user can tag another user (e.g., via an @mention or selection) to identify user(s) associated with the board 152. In some examples, the user can tag a communication channel or other virtual space that can be accessible via the board 152.

In at least one example, the board 152 can comprise one or more sections, such as the section 214 illustrated in FIG. 2A. In some examples, sections can be associated with a section type (e.g., a to-do section, a text block, etc.). In at least one example, each section can be associated with one or more objects, such as the object 216 illustrated in FIG. 2A. In at least one example, an object can comprise text (e.g., editable), a task, an event, an image, a graphic, a link to a local object, a link to a remote object, a file, etc. In at least one example, a section can comprise one or more objects that are associated with a same type of object. That is, in such an example, each object associated with the section can be the same type of object as the other object(s) associated with the section. For instance, a section can be associated with one or more task objects, one or more event objects, one or more text objects, or the like. In at least one example, a section can comprise one or more objects that are associated with a different types of objects. That is, in such an example, one or more objects associated with the section can be different types of objects than as the other object(s) associated with the section. For instance, a section can be associated with a text object, a task object, and a link to a local object. In some examples, individual of the objects can be selectable such that when actuated, data associated with the individual of the objects can be presented via the user interface 146. For example, if an object represents a document stored locally or remotely, based on detecting an actuation of the object, the application 142 can cause the document to be presented via the user interface 146.

In some examples, sections and/or objects can be added to the board 152 through a board builder user interface, described below with reference to FIG. 3. In some examples, sections and/or objects can be added to the board 152 through other mechanisms. For example, a file that has been shared to a communication channel can be added to the board 152 by a user interacting with the file and providing an input to add the file to the board 152. That is, the file—originally posted in the communication channel—can be added to the board 152 by the user. Further, data that has been pinned to the communication channel can be added to a board, electronically or via an input as described above. The order of sections and/or objects within a section can be modified (i.e., rearranged), sections and/or objects can be added or deleted, and/or data associated with sections and/or objects can be modified (i.e., edited) by users with permissions to perform such modifications.

In some examples, the board 152 can be associated with at least one communication channel (e.g., Channel D) and can be sharable with other entities (e.g., users, communication channels, groups, workspaces, organizations, etc.). That is, in at least one example, the board 152 can be shared with another communication channel (or multiple other communication channels), user(s) associated with a workspace (which can be the same workspace or a different workspace as the workspace associated with the at least one communication channel), user(s) associated with an organization (which can be the same organization or a different organization as the organization associated with the at least one communication channel), and/or the like. In at least one example, the board 152 can include a selectable control 218 that, when actuated, can enable the board 152 to be sharable with one or more entities. In some examples, the board management component 116 can receive an indication that the selectable control 218 has been actuated and can cause the presentation of one or more user interfaces to enable the board 152 to be shared. In some examples, the board 152 can be shared using a URI that can be provided to other entities with whom the board 152 is to be shared. In some examples, a URI can be shared to a communication channel, direct message, another board, or the like to enable access to the board 152. In some examples, a user can input one or more identifiers of other entities with whom the board 152 is to be shared and the board management component 116 can associate such identifiers with the board 152.

In at least one example, the board 152 can be associated with permissions, which can indicate who can view the board 152, who can edit and/or modify data associated with the board 152, and/or the like. In some examples, the board 152 can be associated with the same permissions as a communication channel with which it is associated. In some examples, the board 152 can be associated with different permissions than the communication channel with which it is associated.

With respect to boards, it should be noted that the board management component 116 can facilitate versioning, recovery of deleted pages, page histories, and the like. Furthermore, data associated with boards can be searchable using the search mechanism 206, described above. That is, the boards can be searchable. In some examples, data associated with boards can be accessible via an online state (e.g., when the user computing device 104 and the server(s) 102 are capable of communicating via the network(s) 106) or an offline state (e.g., when the user computing device 104 and the server(s) 102 are not capable of communicating via the network(s) 106, for example due to a connectivity problem, a technical problem associated with the server(s) 102 and/or network(s) 106, or the like).

The user interface 146 is a non-limiting example of a user interface that can be presented via the user computing device 104 (e.g., by the application 142). In some examples, the application 142 can receive data from the board management component 116 and/or channel management component 118 and the application 142 can generate and present the user interface 146 based on the data. In other examples, the application 142 can receive data and/or instructions for generating the user interface 146 from the board management component 116 and/or channel management component 118. In such an example, the application 142 can present the user interface 146 based on the instructions. Additional or alternative data can be presented via a user interface and additional or alternative configurations can be imagined.

Figure 3:
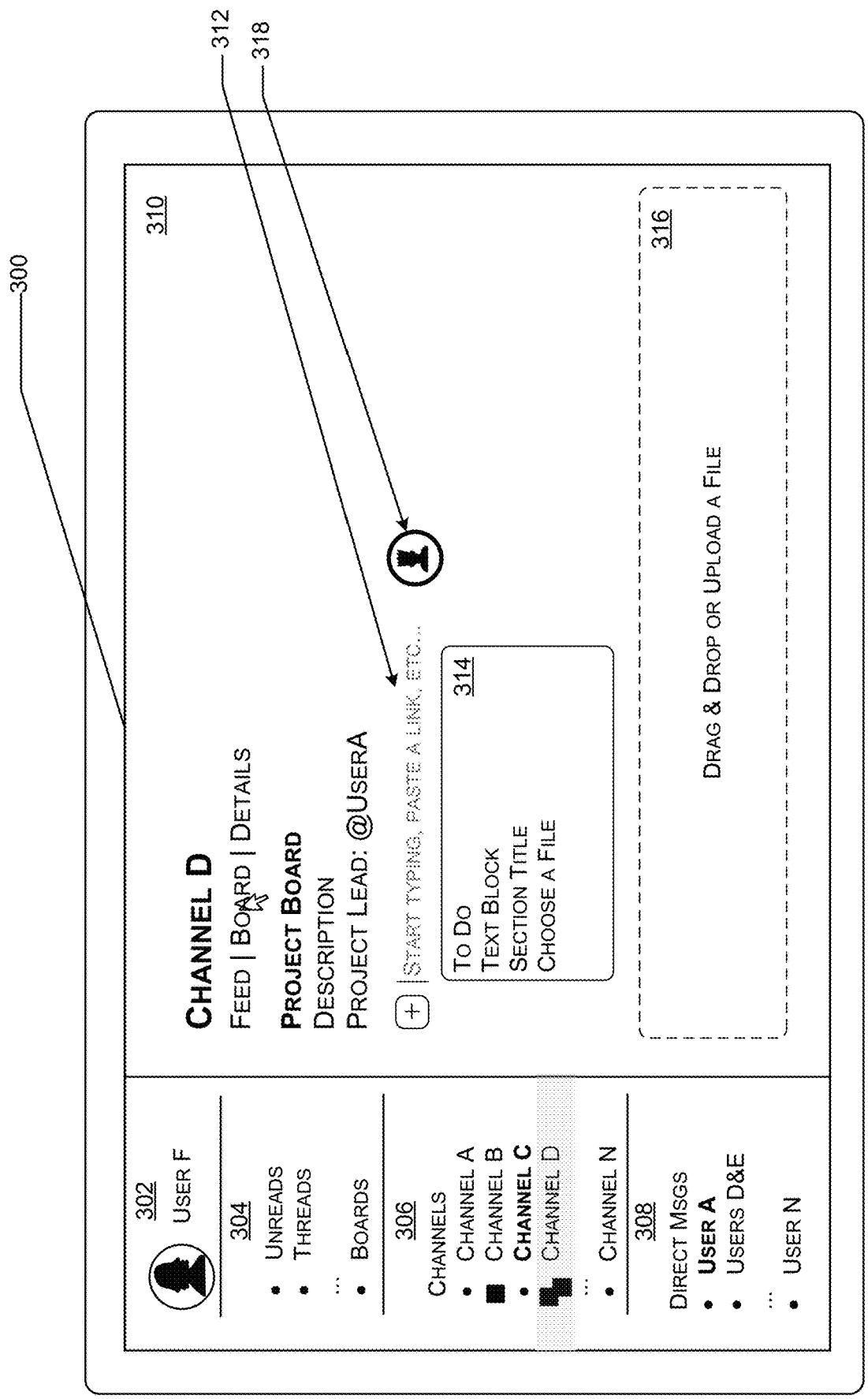
FIG. 3 illustrates an example user interface associated with generating and/or editing a board, as described herein.

FIG. 3 illustrates an example user interface 300 associated with generating and/or editing a board, as described herein. Boards can be customized and/or personalized for one or more different use cases, as described above. In at least one example, a user can interact with the user interface 300 (which can be an "a board builder user interface") to add section(s) and/or object(s) to a board, remove section(s) and/or object(s) from a board, rearrange section(s) and/or object(s) associated with a board, and/or edit, add, and/or delete data associated with section(s) and/or object(s) associated with a board. In some examples, the example user interface 300 can have one or more regions, like the user interface 146, above. For example, the example user interface 300 can include a first region 302 that is substantially similar to the first region 148 described above. In at least one example, the first region 302 can be associated with one or more sub-regions 304-308, which can be the same or similar sub-region(s) 200-204, as described above with reference to FIG. 2.

Further, the example user interface 300 can include a second section 310.

In some examples the second section 310 can be associated with one or more user interface elements that enable a board to be built and/or edited. For example, the user interface 300 can include a user interface element 312 that enables a user to add a new section to a board. In some examples, based at least in part on a user requesting to add a new section, one or more section types can be presented via the user interface 300 to enable the user to select a section type for the new section. In some examples, the user interface element 312 can include a text field wherein a user can begin to type, insert a link, or the like to add an object and/or section. In some examples, a drop-down menu 314 can provide one or more options for adding a new section and/or new object. In at least one example, the user can select an option from the drop-down menu and a corresponding section and/or object can be added to the board. In some examples, a user can drag and drop or upload a file to add to the electronic data board by dropping a file or uploading a file via a mechanism 316 provided via the user interface 300. As described above, in some examples, sections and/or objects can be added to the board 152 through other mechanisms. For example, a file that has been shared to a communication channel can be added to the board 152 by a user interacting with the file and providing an input to add the file to the board 152. That is, the file— originally posted in the communication channel—can be added to the board 152 by the user.

In some examples, text associated with the board can be editable, as described above. Further, in some examples, text associated with the board can be formattable. That is, text can be associated with different formatting, style, or the like. In some examples, text can be hyperlinked, organized in bulleted and/or numbered lists, highlighted, and/or the like.

The order of sections and/or objects within a section can be modified (i.e., rearranged), sections and/or objects can be added or deleted, and/or data associated with sections and/or objects can be modified (i.e., edited) by users with permissions to perform such modifications. In at least one example, multiple users can interact with the user interface 300 (e.g., different instances thereof) to edit a board simultaneously and/or at substantially the same time. For instance, a first user can edit a first section while a second user edits a second section at the same time. Edits or modifications can be processed and presented in real time or near-real time. In some examples, if multiple users are editing and/or modifying a board at the same time, a user interface element 318 can be presented via the user interface 300 to indicate that another user is editing and/or modifying the board. In some examples, the user interface element 318 can provide an indication of which other user is editing the board.

FIG. 3 illustrates a non-limiting example of a user interface 300 that can be presented to enable a user to generate and/or edit a board. Additional or alternative data, which can be arranged in additional or alternative configurations are within the scope of this disclosure. In some examples, the board data 132 can store templates associated with boards. In such examples, a template can have a preconfigured arrangement of sections and/or objects that the user can populate. In some examples, the board management component 116 can auto-populate at least some of the sections and/or objects. Such templates can be editable such that a user can select a template to start from and customized through edits and/or modifications as described herein.

Figure 4:
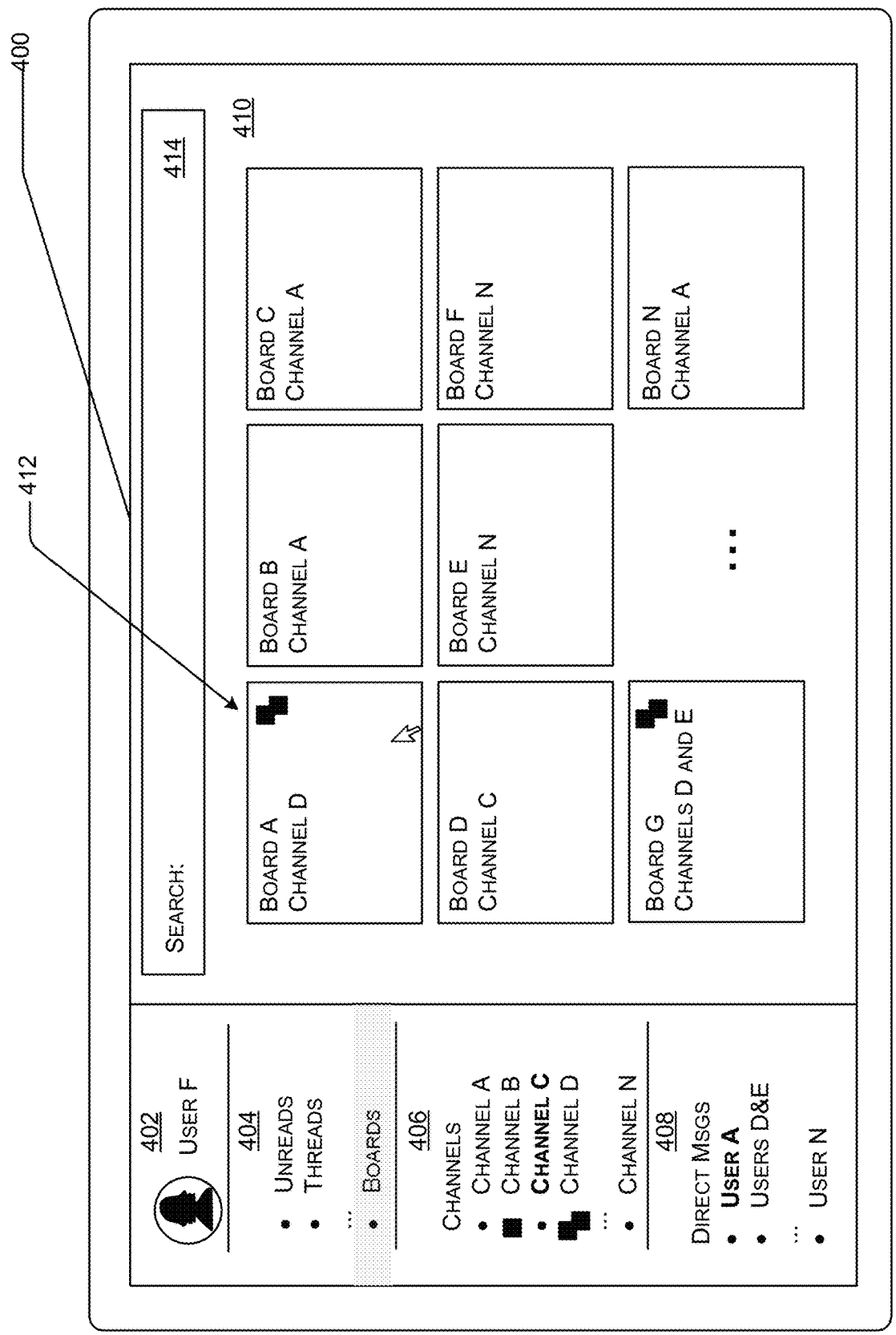
FIG. 4 illustrates an example user interface associated with one or more boards, as described herein.

FIG. 4 illustrates an example user interface 400 associated with one or more boards, as described herein. In some examples, a user can be associated with multiple boards. That is, a user can be associated with one or more boards by being personally associated therewith or by being associated with a communication channel, workspace, organization, or the like that is associated with one or more boards. In some examples, users can access boards from within a communication channel, direct message conversation, or the like. In other examples, a user can access boards via the example user interface 400. In some examples, the example user interface 400 can have one or more regions, like the user interface 146, above. For example, the example user interface 400 can include a first region 402 that is substantially similar to the first region 148 described above. In at least one example, the first region 402 can be associated with one or more sub-regions 404-408, which can be the same or similar sub-region(s) 200-204, as described above with reference to FIG. 2. Further, the example user interface 400 can include a second section 410.

In at least one example, based at least in part on detecting an input associated with a user interface element in the sub-region 404 that corresponds to boards (e.g., "boards"), the board management component 116 can identify one or more boards associated with a user identifier corresponding to the requesting user and can cause representations of the one or more boards to be presented via the user interface 400. For example, the user interface 400 can be associated with one or more user interface elements 412 that can each represent a board. In some examples, a user interface element can comprise a preview of an associated board. In other examples, a user interface element can comprise information associated with a board. In some examples, such information can indicate whether a board is public, private, externally shared, and/or the like. That is, in some examples, a user interface element representative of a board can include additional user interface elements to visually communicate information associated with the board. For instance, a visual element representing that a board is private, public, externally shared, or the like can be presented in association with a user interface element representing the board. In some examples, the user interface element(s) 412 can be presented alphabetically, based on most recent interaction, based on frequency of interactions, based on board type (e.g., public, private, shared, cross-workspace, etc.), based on workspace, in user-designated sections, or the like. In some examples, the second section 410 can depict all boards with which a user is associated. In some examples, the second section 410 can depict a subset of all boards that the user is a member of and the user can interact with the user interface 400 to browse or view other boards that the user is a member of but are not currently displayed in the second section 410. In some examples, the second section 410 can depict boards that have been starred or associated with a specified priority. In some examples, the second section 410 can depict boards that are filtered by particular search criteria (e.g., topic, communication channel, user(s), date, time, workspace, or the like).

In at least one example, the user interface elements can be selectable such that when actuated, the board management component 116 can (i) receive an indication of the actuation, (ii) identify, based at least in part on a board identifier associated with the user interface element, the corresponding board, and (iii) cause the corresponding board to be presented via the user interface 400.

In some examples, the user interface 400 can include a search mechanism 414. In at least one example, a user can input a search query and the board management component 116 can receive the search query, perform a search associated with the board data 132 and identify candidate board(s) to return as search results. Such search results can be presented via the user interface 400. In some examples, such search results can be presented in an order based at least in part on relevance to the search query.

FIG. 4 illustrates a non-limiting example of a user interface 400 that can be presented to enable a user to access board(s) with which they are associated. Additional or alternative data, which can be arranged in additional or alternative configurations are within the scope of this disclosure.

Figure 5:
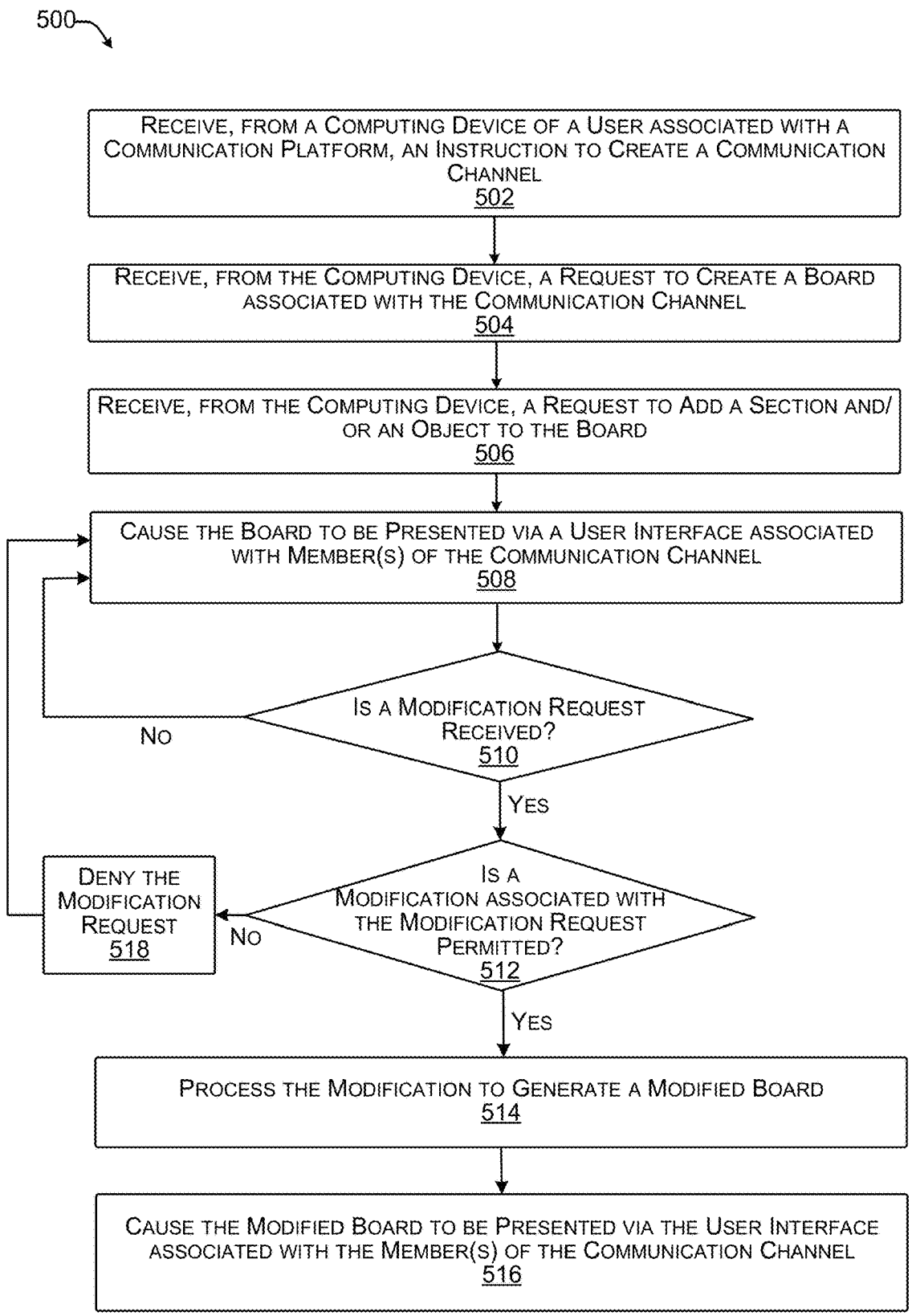
FIG. 5 illustrates an example process for generating and/or editing a board, as described herein, as described herein.
Figure 6:
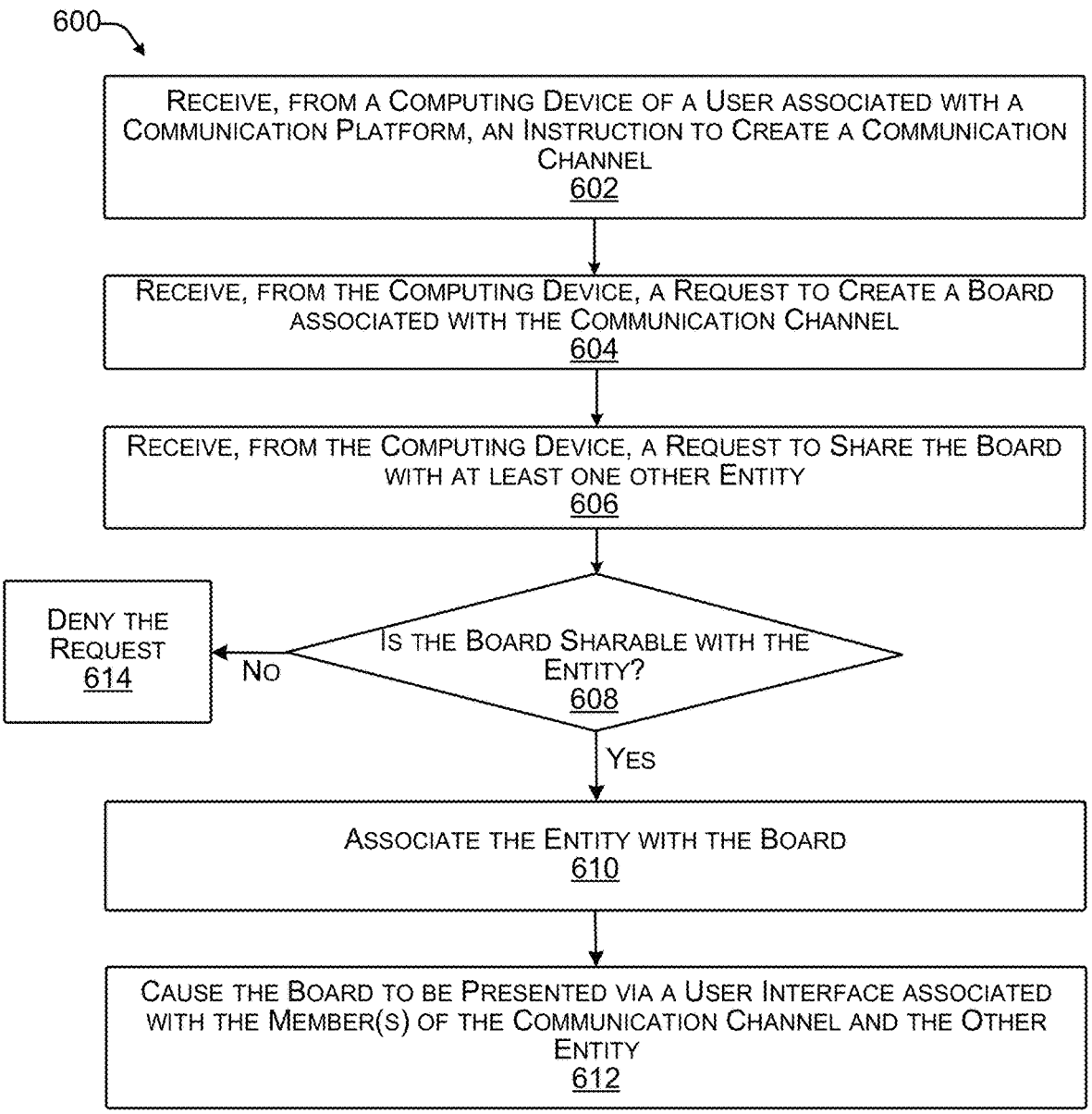
FIG. 6 illustrates an example process for sharing a board with at least one other entity, as described herein.

FIGS. 5-7 are flowcharts showing example processes involving techniques as described herein. The processes illustrated in FIGS. 5-7 are described with reference to components described above with reference to the environment 100 shown in FIG. 1 for convenience and ease of understanding. However, the processes illustrated in FIGS. 5-7 are not limited to being performed using the components described above with reference to the environment 100. Moreover, the components described above with reference to the environment 100 are not limited to performing the processes illustrated in FIGS. 5-7.

The processes in FIGS. 5-7 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the processes in FIGS. 5-7 can be combined in whole or in part with each other or with other processes.

FIG. 5 illustrates an example process 500 for generating and/or editing a board, as described herein, as described herein.

At operation 502, the channel management component 118 can receive, from a computing device of a user associated with a communication platform, an instruction to create a communication channel. In at least one example, the channel management component 118 can receive a request to establish a communication channel between and among one or more other users. In such an example, the request can indicate an identifier of the sender of the request and one or more identifiers associated with one or more other users. The channel management component 118 can establish a communication channel between the user and the one or more other users such that the users can utilize their respective user computing devices to communicate and share data between and among each other. In at least one example, the channel management component 118 can manage such communications and/or sharing of data. In at least one example, the communication channel can be associated with a channel identifier and can be associated with one or more permissions. The communication channel can be public, private, externally shared and/or the like. Channel data and/or permission data associated therewith can be stored in the channel data 130 and/or permission data 126.

At operation 504, the board management component 116 can receive, from the computing device, a request to create a board associated with the communication channel. As described above, in at least one example, the board management component 116 can facilitate the creation of, modification of, and/or presentation of boards, as described herein. In some examples, the board management component 116 can present user interfaces to enable users to generate boards comprising one or more sections and/or one or more objects. In at least one example, the board management component 116 can receive a request to create a board. In some examples, the board can be associated with the communication channel. In some examples, the board can be shared with other communication channels. In some examples, the other communication channels can be public, private, and/or externally shared. In at least one example, the board can be associated with the same permissions as the communication channel. In some examples, if the board is shared with other communication channels, the board can be associated with the most restrictive permissions. In some examples, permissions can be set for a board by a host (e.g., the user, group, organization with which it originated). In some examples, users with particular roles (e.g., administrators) can manage permissions associated with the board.

At operation 506, the board management component 116 can receive, from the computing device, a request to add a section and/or an object to the board. As described above, in at least one example, boards can include sections and/or objects. In some examples, each section can include one or more objects. In at least one example, an object can comprise text (e.g., which can be editable), a task, an event, an image, a graphic, a link to a local object, a link to a remote object, a file, and/or the like. In some examples, the sections and/or objects can be reordered and/or otherwise rearranged, new sections and/or objects can be added or removed, and/or data associated with such sections and/or objects can be modified. That is, boards can be created and/or modified for various uses. In some examples, the board management component 116 can present user interfaces to enable users to generate boards comprising one or more sections and/or one or more objects. In at least one example, the board management component 116 can receive a request— via a user interface—to add a section and/or an object to a board.

At operation 508, the board management component 116 can cause the board to be presented via a user interface associated with member(s) of the communication channel. In at least one example, the board management component 116 can cause the board to be presented via a user interface of a user computing device. Examples of such a board are provided in FIGS. 1 and 2A-2C above. As described above, in some examples, the board can be presented via a pop-up, a new user interface and/or new window, an overlay, a separate region, pane, and/or window proximate to the second region 150, a split region, pane, and/or window with the feed within the second region 150, instead of the second region 150, and/or the like. In some examples, the board can be viewable to users with permissions to view. In an example where the board is associated with a communication channel, such users can include members of the communication channel. In such an example, the board management component 116 can cause the board to be presented via user computing devices associated therewith If a board is associated with a group (e.g., a workspace, organization, etc.), members of such a group may have permission to view the board and thus the board management component 116 can cause the board to be presented via user computing devices associated therewith.

At operation 510, the board management component 116 can determine whether a modification request is received. As described above, boards can support editable text and/or objects that can be ordered, added, deleted, modified, and/or the like by one or more members of the at least one communication channel with which the board is associated and/or a user with permissions to modify the board and/or data associated therewith. In some examples, the board management component 116 can present user interfaces to enable users to modify boards. In an example, the board management component 116 can access data associated with the board and can cause the presentation of one or more user interfaces to enable modification to the board. In some examples, the board management component 116 can receive an indication of an input associated with such user interfaces, which can be associated with a modification request. The modification request can identify the board, an object and/or a section, a user associated with the request, a requested modification, and/or the like.

In at least one example, if a request for a modification is not received (i.e., "no" at operation 510), the process 500 can return to operation 508.

In at least one example, if a request for a modification is received (i.e., "yes" at operation 510), the board management component 116 can determine whether a modification associated with the modification request is permitted, as illustrated at operation 512. In such an example, the board management component 116 can access permission data 126 to determine whether the modification requested is permitted for the user requesting to make such a modification. If the modification is permitted, the board management component 116 can process the modification, as illustrated at operation 514. Such modifications can be reflected in a modified board that can be caused to be presented, and in data associated with the board (e.g., as stored in the datastore 122). In at least one example, the board management component 116 can cause the modified board to be presented via the user interface associated with the member(s) of the communication channel, as illustrated at operation 516.

At operation 518, the board management component 116 can deny the modification request and the process can return to operation 508. In at least one example, if the user requesting to perform the modification is not authorized to do so (e.g., per the permission data 126), the board management component 116 can deny the request, as illustrated at operation 518, and the process 500 can return to operation 508. In some examples, the board management component 116 can send a notification to the user computing device or otherwise indicate that the modification request is denied to the user.

As described above, the order of sections and/or objects within a section can be modified (i.e., rearranged), sections and/or objects can be added or deleted, and/or data associated with sections and/or objects can be modified (i.e., edited) by users with permissions to perform such modifications. In at least one example, multiple users can interact with a user interface (e.g., different instances thereof) to edit a board simultaneously and/or at substantially the same time. For instance, a first user can edit a first section while a second user edits a second section at the same time. Edits or modifications can be processed and presented in real time or near-real time. In some examples, if multiple users are editing and/or modifying a board at the same time, a user interface element can be presented via the user interface to indicate that another user is editing and/or modifying the board. In some examples, the user interface element can provide an indication of which other user is editing the board. An example of a user interface that can facilitate creation and/or editing of a board is illustrated in FIG. 3 above.

FIG. 6 illustrates an example process 600 for sharing a board with at least one other entity, as described herein.

At operation 602, the channel management component 118 can receive, from a computing device of a user associated with a communication platform, an instruction to create a communication channel, as described above with reference to operation 502 of FIG. 5.

At operation 604, the board management component 116 can receive, from the computing device, a request to create a board associated with the communication channel, as described above with reference to operation 504 of FIG. 5.

At operation 606, the board management component 116 can receive, from the computing device, a request to share the board with at least one other entity. In some examples, a board can be sharable such that data associated with the board is accessible to and/or interactable for members of the multiple communication channels, workspaces, organizations, and/or the like. In at least one example, the board management component 116 can receive a request to share the board with at least one other entity. The request can include an identifier of the at least one other entity. The entity, as described above, can be a user, a communication channel, a group (e.g., a workspace, an organization, etc.), or the like. That is, the board can be sharable with users associated with different communication channels, workspaces, organizations, and/or the like.

At operation 608, the board management component 116 can determine whether the board is sharable with the entity. In at least one example, the board management component 116 can access permission data 126 to determine whether (i) the user requesting to share the board is permitted to do so and/or (ii) whether the entity is permitted to access the board. Based at least in part on a determination that the board is sharable with the entity (i.e., "yes" at operation 608), the board management component 116 can associate the entity with the board, as illustrated at operation 610. In at least one example, the board management component 116 can map, or otherwise associate, the entity with the board in the board data 132 and/or any other data associated with the entity (e.g., user data 124, group data 128, channel data 130, etc.). Based at least in part on associating the entity with the board, the board management component 116 can cause the board to be presented via a user interface associated with member(s) of the communication channel and the other entity.

At operation 612, the board management component 116 can cause the board to be presented via a user interface associated with the member(s) of the communication channel and the other entity. In at least one example, the board management component 116 can cause the board to be presented via a user interface of a user computing device. Examples of such a board are provided in FIGS. 1 and 2A-2C above. As described above, in some examples, the board can be presented via a pop-up, a new user interface and/or new window, an overlay, a separate region, pane, and/or window proximate to the second region 150, a split region, pane, and/or window with the feed within the second region 150, instead of the second region 150, and/or the like. In some examples, the board can be viewable to users with permissions to view. In an example where the board is associated with a communication channel, such users can include members of the communication channel. In such an example, the board management component 116 can cause the board to be presented via user computing devices associated therewith If a board is associated with a group (e.g., a workspace, organization, etc.), members of such a group may have permission to view the board and thus the board management component 116 can cause the board to be presented via user computing devices associated therewith. In at least one example, based at least in part on causing the board to be presented via the user interface, a user associated therewith can view, edit, modify, and/or otherwise interact with the board (e.g., so long as permissions permit such). In some examples, shared boards can be associated with permissions of the sharing entity (e.g., the host), permissions of the receiving entity (e.g., the invitee), permissions that are set by the host and the invitee, a designated set of permissions, or the like. In some examples, shared boards can have different configurations and/or permissions for different groups associated with the shared board.

In at least one example, either (i) the user requesting to share the board is not permitted to do so and/or (ii) the entity is not permitted to access the board, the board management component 116 can deny the request (i.e., "no" at operation 608), as illustrated at operation 614. In some examples, the board management component 116 can send a notification to the user computing device or otherwise indicate that the request is denied.

FIG. 7 illustrates another example process 700 for modifying a board, as described herein. FIG. 7 illustrates three separate devices, a first computing device 702 associated with a first user, a second computing device 704 associated with a second user, and the server(s) 102 as described above with reference to FIG. 1.

At operation 706, an application, web browser or the like can send, from the first computing device 702 associated with the first user, a first request to edit a first section and/or object of a board. As described above, a board can support editable text and/or objects that can be ordered, added, deleted, modified, and/or the like by users who have permission to modify the board. In at least one example, a first user can send a first request to edit a section and/or object of the board. At operation 708, the board management component 116 can receive the first request.

At operation 710, an application, web browser or the like can send, from the second computing device 704 associated with the second user, a second request to edit a second section and/or object of a board. In at least one example, a second user can send a second request to edit a section and/or object of the board. At operation 712, the board management component 116 can receive the first request. In some examples, the requested edits can be associated with a same section or different section. In some examples, the requested edits can be associated with a same object or a different object. In some examples, the requested edits can be associated with the same operation or different operations.

At operation 714, the board management component 116 can determine whether the first request and the second request create a conflict. In some examples, two users can request to edit the board such to create a conflict. For instance, the first user can provide an input to re-order the sections in a first order and the second user can provide an input to re-order the sections in a second order different than the first order. This can create a conflict. Or, the first user can request to edit an object and the second user can request to delete an object. This, too, can create a conflict. Additional or alternative examples of conflicts are within the scope of this disclosure.

Based at least in part on a determination that the first request and the second request do not create a conflict, the board management component 116 can process the first request and the second request, as illustrated at operation 716. That is, if the requested edits do not cause a conflict, the board management component 116 can process the requests.

At operation 718, the board management component 116 can cause the updated board to be presented via the first computing device 702 and the second computing device 704. In some examples, the board management component 116 can send an indication of the update to the computing devices and the computing devices can cause the updates to be presented via the board. In other examples, the board management component 116 can send an updated board to each of the computing devices for presentation thereon. In some examples, the board management component 116 can cause an indication to be presented in associated with a board to indicate that the board has been updated. In some examples, such an indication can be a user interface element, a visual change to an existing user interface element (e.g., bolding a user interface element in the first sub-section 200), or the like.

Based at least in part on a determination that there is a conflict between the first request and the second request, the board management component 116 can, at operation 720, resolve the conflict and process the first request or the second request. That is, the board management component 116 can perform a conflict resolution process to resolve the conflict. In some examples, the board management component 116 can utilize one or more conflict-free replicated data type (CRDT) algorithms to resolve any conflicts between he first request and second request, or portions thereof. In some examples, such a process can cause the board management component 116 to present a notification via the first computing device 702 and the second computing device 704 to alert the first user and the second user of the conflict. The first user and the second user can provide an input to resolve the conflict. In other examples, certain edits can be prioritized over other edits (e.g., the first request can be prioritized and processed instead of the second request, or vice versa). In at least one example, the board management component 116 can process the first request or the second request. Then, the board management component 116 can cause the updated board to the first computing device and the second computing device, as illustrated at operation 718. In some examples, the board management component 116 can process one of the requests (e.g., the first request or the second request) fully and the other request partially (e.g., a part that does not conflict with the first request), both requests in part (e.g., parts of the requests that do not conflict with one another), or the like.

Example Clauses

A. A method implemented at least in part by one or more computing devices of a communication platform, the method comprising: receiving a request to add a new object to a board associated with at least one communication channel of the communication platform, wherein the board comprises one or more sections, wherein a section of the one or more sections is associated with one or more objects, and wherein the at least one communication channel is associated with one or more first users; associating the new object with the board; and causing the board to be presented via a user interface associated with a member of the at least one communication channel, wherein the board, when presented, includes the new object and wherein the board is sharable with one or more second users associated with a different group than the one or more first users.

B. The method of paragraph A, wherein the one or more first users are associated with a first workspace, having a first group identifier and a first set of permissions, and the one or more second users are associated with a second workspace, having a second group identifier and a second set of permissions.

C. The method of paragraph A or B, wherein the one or more first users are associated with a first organization, having a first group identifier and a first set of permissions, and the one or more second users are associated with a second organization, having a second group identifier and a second set of permissions.

D. The method of any of paragraphs A-C, wherein the at least one communication channel is a shared communication channel and the one or more first users and the one or more second users are associated with the shared communication channel.

E. The method of any of paragraphs A-D, wherein the new object comprises text, a task, an event, an image, a graphic, a link to a local object, a link to a remote object, or a file.

F. The method of any of claims A-E, wherein the one or more objects associated with the section are a same object type as each other.

G. The method of any of paragraphs A-F, wherein the one or more objects associated with the section comprise a first object of a first object type and a second object of a second object type different than the first object type.

H. A system comprising: one or more processors; and one or more non-transitory computer-readable media that, when executed by the one or more processors, cause the system to perform operations comprising: receiving a request to modify a board associated with at least one communication channel of a communication platform, wherein the at least one communication channel is associated one or more first users; based at least in part on processing the request, modifying the board; and causing the board to be presented via a user interface associated with a member of the at least one communication channel, wherein the board is sharable with at least one or more second users associated with a different group than the one or more first users.

I. The system of paragraph H, wherein the one or more first users are associated with a first group identifier and a first set of permissions and the one or more second users are associated with a second group identifier and a second set of permissions.

J. The system of paragraph H or I, wherein the board is associated with editable text and one or more objects capable of being at least one of reordered, added, deleted, or edited by members of the at least one communication channel.

K. The system of any of paragraphs H-J, wherein the user interface includes the board and at least one other board associated with at least one other communication channel of the communication platform with which the member is associated.

L. The system of any of paragraphs H-K, wherein the request to modify the board comprises a request to add a new section to the board, the operations further comprising: causing one or more section types to be presented via the user interface; and based at least in part on a selection of a section type of the one or more section types, modifying the board to include the new section, the new section being associated with the section type.

M. The system of any of paragraphs H-L, wherein the request to modify the board comprises a request to add a new object to the board, the operations further comprising modifying the board to include the new object, wherein the new object comprises text, a task, an event, an image, a graphic, a link to a local object, a link to a remote object, or a file, and the new object is associated with a section of the board.

N. The system of any of paragraphs H-M, wherein the board is presented via the user interface proximate to a message feed comprising one or more messages associated with the at least one communication channel.

O. The system of any of paragraphs H-N, wherein the board is presented via the user interface in a first window, and wherein a message feed, comprising one or more messages associated with the at least one communication channel, is presented via the user interface in a second window.

P. One or more non-transitory computer-readable media that, when executed by one or more processors, cause the one or more processors to perform operations comprising: receiving a request to modify a board associated with at least one communication channel of a communication platform, wherein the board is associated with editable text and one or more objects capable of being at least one of reordered, added, deleted, or edited by one or more first users associated with the at least one communication channel; based at least in part on processing the request, modifying the board; and causing the board to be presented via a user interface associated with a member of the at least one communication channel, wherein the board is sharable with one or more second users associated with a different group than the one or more first users.

Q. The one or more non-transitory computer-readable media of paragraph P, wherein the request to modify the board comprises a request to add a new object to the board, the operations further comprising modifying the board to include the new object, wherein the new object comprises text, a task, an event, an image, a graphic, a link to a local object, a link to a remote object, or a file, and the new object is associated with a section of the board.

R. The one or more non-transitory computer-readable media of paragraph P or Q, wherein the request to modify the board comprises a request to add a new section to the board or a request to add a new object to the board.

S. The one or more non-transitory computer-readable media of any of paragraphs P—R, wherein the board is associated with a same set of permissions as the at least one communication channel.

T. The one or more non-transitory computer-readable media of any of paragraphs P—S, wherein the one or more first users are associated with a first group identifier and a first set of permissions and the one or more second users are associated with a second group identifier and a second set of permissions.

While the example clauses described above are described with respect to one particular implementation, it should be understood that, in the context of this document, the content of the example clauses can also be implemented via a method, device, system, a computer-readable medium, and/ or another implementation. Additionally, any of paragraphs A-T may be implemented alone or in combination with any other one or more of the paragraphs A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method implemented at least in part by one or more computing devices of a communication platform, the method comprising:
   receiving a request to add a new object to a board associated with at least one communication channel of the communication platform, wherein the at least one communication channel comprises a virtual space for collaboration between one or more first users of the at least one communication channel, wherein the one or more first users are associated with a first group;
   associating the first group with a first set of permissions with respect to the board;
   associating a second group with a second set of permissions with respect to the board;
   associating the new object with the board;
   causing the board to be presented via a user interface associated with at least one first user of the one or more first users, wherein the board, when presented, includes the new object and a selectable icon;
   detecting selection of the selectable icon; and
   based at least in part on detecting the selection, configuring the board to be sharable with one or more second users associated with the second group.

2. The method of claim 1, wherein the one or more first users are associated with a first workspace, having a first group identifier, and the one or more second users are associated with a second workspace, having a second group identifier.

3. The method of claim 1, wherein the one or more first users are associated with a first organization, having a first group identifier, and the one or more second users are associated with a second organization, having a second group identifier.

4. The method of claim 1, wherein the at least one communication channel is a shared communication channel and the one or more first users and the one or more second users are associated with the shared communication channel.

5. The method of claim 1, wherein the new object comprises text, a task, an event, an image, a graphic, a link to a local object, a link to a remote object, or a file.

6. The method of claim 1, wherein the board comprises one or more sections, and wherein a section of the one or more sections is associated with one or more objects, and wherein at least one of:
   the one or more objects associated with the section are a same object type as each other; or
   the one or more objects associated with the section comprise a first object of a first object type and a second object of a second object type different than the first object type.

7. A system comprising:
   one or more processors; and
   one or more non-transitory computer-readable media that, when executed by the one or more processors, cause the system to perform operations comprising:
      associating a board with at least one communication channel of a communication platform, wherein the at least one communication channel comprises a virtual space for collaboration between one or more first users;

associating the one or more first users with a first group;

associating the one or more first users with a first set of permissions with respect to the board;

associating one or more second users with a second group;

associating the one or more second users with a second set of permissions with respect to the board;

receiving a request to modify the board;

based at least in part on processing the request, modifying the board;

causing the board to be presented via a user interface associated with at least one first user of the one or more first users, wherein the board includes a selectable icon;

detecting selection of the selectable icon; and based at least in part on detecting the selection, configuring the board to be sharable with at least the one or more second users.

8. The system of claim 7, wherein the board is associated with editable text and one or more objects capable of being at least one of reordered, added, deleted, or edited by the one or more first users.

9. The system of claim 7, wherein the user interface includes the board and at least one other board associated with at least one other communication channel of the communication platform with which the at least one first user is associated.

10. The system of claim 7, wherein the request to modify the board comprises a request to add a new section to the board, the operations further comprising:

causing one or more section types to be presented via the user interface; and based at least in part on a selection of a section type of the one or more section types, modifying the board to include the new section, the new section being associated with the section type.

11. The system of claim 7, wherein the request to modify the board comprises a request to add a new object to the board, the operations further comprising modifying the board to include the new object, wherein the new object comprises text, a task, an event, an image, a graphic, a link to a local object, a link to a remote object, or a file, and the new object is associated with a section of the board.

12. The system of claim 7, wherein the board is presented via the user interface proximate to a message feed comprising one or more messages associated with the at least one communication channel.

13. The system of claim 7, wherein the board is presented via the user interface in a first window, and wherein a message feed, comprising one or more messages associated with the at least one communication channel, is presented via the user interface in a second window.

14. One or more non-transitory computer-readable media that, when executed by one or more processors, cause the one or more processors to perform operations comprising:

associating a board with at least one communication channel of a communication platform, wherein the at least one communication channel comprises a virtual space for collaboration between one or more first users;

associating the one or more first users with a first group;

associating the one or more first users with a first set of permissions with respect to the board;

associating one or more second users with a second group;

associating the one or more second users with a second set of permissions with respect to the board;

receiving a request to modify the board, wherein the board is associated with editable text and one or more objects capable of being at least one of reordered, added, deleted, or edited by the one or more first users;

based at least in part on processing the request, modifying the board;

causing the board to be presented via a user interface associated with at least one first user of the one or more first users, wherein the board includes a selectable icon;

detecting selection of the selectable icon; and based at least in part on detecting the selection, configuring the board to be sharable with at least one second user of the one or more second users.

15. The one or more non-transitory computer-readable media of claim 14, wherein the request to modify the board comprises a request to add a new section to the board or a request to add a new object to the board.

16. The method of claim 1, wherein the first set of permissions allow the one or more first users to view and edit the board, and the second set of permissions allow the one or more second users to view the board but not edit the board.

17. The method of claim 2, wherein the first set of permissions are stored in association with the first group identifier and the second set of permissions are stored in association with the second group identifier.

18. The method of claim 1, wherein the user interface comprises a first user interface, and wherein configuring the board to be sharable comprises causing presentation of one or more second user interfaces configured to receive input indicating an intent to share the board.

19. The method of claim 1, wherein configuring the board to be shareable comprises causing presentation of a shareable URL associated with the board.

20. The method of claim 1, wherein configuring the board to be shareable comprises receiving identifiers of the one or more second users.

* * * * *